(12) United States Patent  
Lubanski

(10) Patent No.: US 7,385,139 B2  
(45) Date of Patent: *Jun. 10, 2008

(54) CABLE PROTECTION SYSTEM

(75) Inventor: Thomas M. Lubanski, Claremont, CA (US)

(73) Assignee: Peterson Systems International, Inc., Duarte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/605,602

(22) Filed: Nov. 29, 2006

(65) Prior Publication Data

US 2007/0095561 A1 May 3, 2007

Related U.S. Application Data

(62) Division of application No. 11/263,099, filed on Oct. 31, 2005, now Pat. No. 7,309,836.

(51) Int. Cl.  
*H02G 3/04* (2006.01)

(52) U.S. Cl. ............... 174/97; 174/68.1; 174/101; 403/387; 138/155

(58) Field of Classification Search ............ 174/135, 174/68.1, 91, 95–98, 136, 101, 70 C, 482, 174/484, 481; 104/275; 14/69.5; 403/387; 52/220.5; 138/155, 157, 106, 105, 110; 248/74.1, 248/74.2; 439/120, 209, 212, 216  
See application file for complete search history.

(56) References Cited

U.S. PATENT DOCUMENTS 5,777,266 A * 7/1998 Herman et al. ............ 174/68.1  
6,499,410 B1  12/2002 Berardi  
7,145,079 B1  12/2006 Henry \* cited by examiner

*Primary Examiner*—Dhiru R Patel  
(74) *Attorney, Agent, or Firm*—Holland & Hart

(57) ABSTRACT

A cable protection system includes at least one cable protector having at least one channel extending between its opposing ends for receiving at least one cable. The cable protector may include a cover structure pivotally attached to a base member by a hinge rod inserted through hinge members formed in the cover structure and the base member. A first ramp or an additional cable protector may be attached to the cable protector by inserting one or more connectors formed on the first ramp or additional cable protector into vertically oriented apertures defined in a side of the cable protector. One or more connectors may also be formed on a side of the cable protector opposing the apertures to removably attach the cable protector to a second ramp or an additional cable protector.

12 Claims, 17 Drawing Sheets

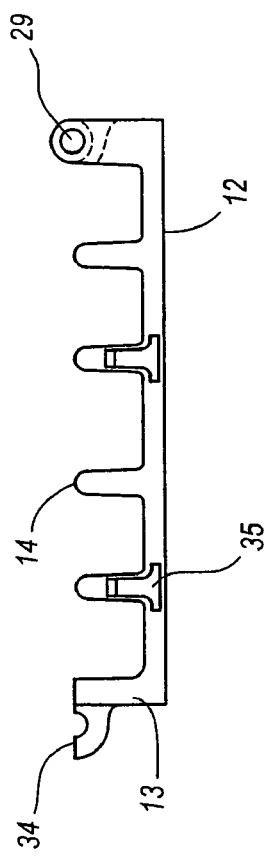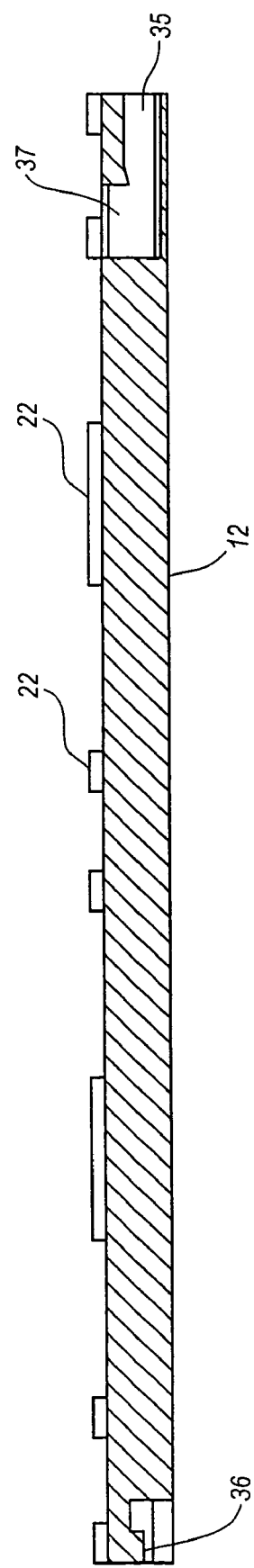

CABLE PROTECTION SYSTEM

RELATED APPLICATION

This application is a divisional of application Ser. No. 11/263,099 filed 31 Oct. 2005 now U.S. Pat. No. 7,309,836.

FIELD OF THE INVENTION

The present invention relates generally to cable protectors and cable protection systems.

BACKGROUND OF THE INVENTION

Over the years, various devices and apparatuses have been developed in an effort to protect hoses, cables, wiring and the like from physical damage. In particular, numerous cable protector designs have been developed to protect cabling extending across walkways, roadways, and construction sites from physical damage caused by pedestrians, vehicular traffic and other such external elements. Cable protectors have also proven useful in helping to minimize the risk of pedestrians tripping over such cabling. For the purposes of this disclosure, the terms "cable" and "cabling" shall be broadly construed to include data cables, hoses, electrical wiring, telephone cables, conduits, optical fibers, pneumatic tubing, plumbing, and any other length of material.

Conventional cable protectors typically include one or more channels extending in parallel between opposing ends of the cable protector to receive one or more cables. Side ramps may extend laterally outward from, or may be removably attachable to, the sides of the cable protector to allow vehicles and the like to roll over the top of the cable protector. Interlockable T-shaped connector elements may be formed on the ends of the cable protector to enable a series of cable protectors to be attached together in an end-to-end fashion to accommodate cables of varying lengths. T-shaped connector elements may also be formed on the sides of the cable protector to enable a number of cable protectors to be attached in a parallel side-by-side fashion to accommodate large numbers of cables. Similarly, T-shaped side connectors may be formed on the sides of the side ramps to enable their removable attachment to the sides of the cable protector.

Traditionally, the side ramps extending from or attachable to conventional cable protectors are formed with a relatively short base and steep slope. Although this relatively steep slope is easily navigable by motorized vehicles and pedestrians of average strength, these slopes can be a significant hurdle or obstacle to the elderly or handicapped. Accordingly, the side ramps extending from or attachable to some conventional cable protectors have been formed with a more gradual slope so that a wheelchair, walker or the like can pass over the cable protector with minimal effort. These conventional ramps have also been equipped with side rails or curbs to restrain the wheelchair from falling off the edges of the ramp. Such a configuration has proven advantageous for baby strollers, walkers, bicycles, tricycles, scooters, wagons, roller blades, skateboards, and the like.

The connectors used to detachably interlock or connect the various modular elements in conventional modular cable protection systems, whether or not the ramps of the system have been adapted for use by the handicapped and elderly, suffer from a number of drawbacks and disadvantages. For example, the complimentary male and female T-shaped connectors formed along the sides of the main cable protector undesirably increase the overall width of the cable protector without increasing the cable-housing capacity of the cable protector itself. Specifically, because the T-shaped male and female connectors must be formed along the outer edges of the channels formed in the cable protector for housing the cabling, a substantial portion of the overall width of the cable protector is devoted to non-cable-housing uses. Thus, cable protectors employing T-shaped connector elements along its sides are typically much wider than non-modular cable protectors of the same cable-housing capacity. This configuration results in an inefficient waste in the amount of material required to produce the cable protector, which in turn results in an undesirable increase in overall production costs.

Similarly, the conventional strap-like ramp connectors used to detachably connect the wheelchair ramps to the cable protector suffer from a number of disadvantages. Specifically, because the protrusions formed on these strap-like ramp connectors must be engaged within recesses formed on the undersides of the wheelchair ramps and the cable protector, a user attempting to interconnect these elements may struggle to correctly align the protrusions within the appropriate recess when the undersides of the cable protector and the ramps are positioned so as to face the ground. In addition, because the detachable connection formed by engaging the strap-like connector's protrusions in the appropriate recesses is relatively weak, a strong torsional force applied to the wheelchair ramp (such as one transferred from the wheel of a heavy or powered vehicle) may be large enough to pull or break the protrusion from the recess it is engaged within.

Accordingly, a need exists for a cable protection system capable of quickly and easily expanding to a number of widths and lengths. A need also exists for a system that makes efficient use of the materials used to form the cable protector base and is capable of being adapted for use by the elderly and handicapped. Such a system may consist of various elements that are easy to align and interconnect and are capable of withstanding relatively large amounts of torsional force.

SUMMARY OF THE INVENTION

According to at least one embodiment, a cable protection system comprises at least one cable protector having a base member, at least one channel extending between opposing ends of the base member for receiving at least one cable, and a first ramp removably attachable to a first side of the base member. The first ramp may comprise at least one connector configured to be insertable into a vertically oriented aperture defined in a first side of the base member to removably attach the first ramp to the first side of the base member. In addition, the cable protector may comprise a cover structure pivotally attached to the base member by a hinge rod inserted through hinge members formed in the cover structure and the base member. Alternatively, the base member of the cable protector may comprise a pair of substantially vertically extending opposing side walls and a cover structure positioned on the upper surfaces of, and unitarily formed with, the opposing side walls.

In certain embodiments, the aperture defined in the first side of the base member is generally slot shaped, while the connector of the first ramp is substantially vertically oriented and configured to removably snap fit into the aperture defined in the base member. To facilitate this snap fit connection, a coupling structure may be formed on the connector of the first ramp and a complimentary coupling recess may be defined within the aperture in the base member, with the coupling structure configured to removably snap fit into the complimentary coupling recess to retain the connector within the aperture. In at least one embodiment, the coupling structure is a protuberance formed on a surface of the connector. The complimentary coupling recess may be configured to match the dimensions of the protuberance.

A second ramp may also be removably attachable to a second side of the base member. To facilitate this removable attachment, a substantially vertically oriented aperture may be defined in this second ramp and at least one connector may be formed on the second side of the base member and configured to be insertable into the aperture in the second ramp. The cable protection system may also comprise a first edge rail removably attachable to a first end of the first ramp, a second edge rail removably attachable to a first end of the second ramp, and a center edge rail positioned between and removably attachable to the first and second edge rails.

In certain embodiments, the first ramp and/or the second ramp may be configured to laterally overlap an additional ramp or an additional cable protector. The first ramp and/or the second ramp may also comprise a substantially planar top surface and an angled bottom surface. In addition, the cable protection system may further comprise an additional cable protector, at least one substantially vertically oriented aperture defined in a side of the additional cable protector, and at least one connector formed on the base member and configured to be insertable into the aperture in the additional cable protector to attach the two cable protectors together in a side-by-side fashion. In at least one embodiment, the cable protector and the first ramp comprise a substantially transparent material capable of being illuminated by a light source.

In certain embodiments, a cable protector comprises a base member having at least one channel extending between opposing ends of the base member. A substantially vertically oriented connector may be formed on the base member and configured to be removably insertable into an aperture defined in a ramp or in an additional cable structure. A cover may also be pivotally attached to the base member by a hinge rod inserted through hinge members formed in the cover and the base member.

In at least one embodiment, a method of assembling a cable protection system comprises providing at least one cable protector having at least a first side, providing a substantially vertically oriented aperture in the first side of the cable protector, providing a first ramp, providing a connector on the first ramp, and inserting the connector of the first ramp into the aperture in the base member to removably attach the first ramp to the first side of the cable protector. According to certain embodiments, the substantially vertically oriented aperture defined in the base member is slot shaped. The connector of the first ramp may also be substantially vertically oriented and configured to removably snap fit into the aperture defined in the base member. In addition, the first ramp and/or the second ramp may be configured to laterally overlap an additional ramp or an additional cable protector. The first ramp and/or the second ramp may also comprise a substantially planar top surface and an angled bottom surface. The method may also further comprise removably attaching a second ramp to a second side of the cable protector.

According to some embodiments, a cable protection system comprises at least one cable protector having a base member, at least one channel extending between opposing ends of the base member and structured to receive at least one cable, at least one vertically oriented slot defined in a first side of the base member, a coupling recess defined within the slot in the base member, a first ramp comprising at least one vertically oriented connector, and a coupling structure formed on the connector of the first ramp. The coupling structure formed on the connector of the first ramp may be configured to removably snap fit into the coupling recess defined within the slot in the base member to removably attach the first ramp to the first side of the base member.

Features from any of the above-mentioned embodiments may be used in combination with one another in accordance with the present invention. These and other embodiments, features and advantages will be more fully understood upon reading the following detailed description in conjunction with the accompanying drawings and claims.

BRIEF DESCRIPTION OF THE DRAWINGS

The accompanying drawings illustrate exemplary embodiments of the present invention and are a part of the specification. Together with the following description, the drawings demonstrate and explain the principles of the present invention.

FIG. 4A is an end view of the base member illustrated in FIG. 3.

FIG. 4B is a cutaway side view of the base member illustrated in FIG. 3.

Figure 1:
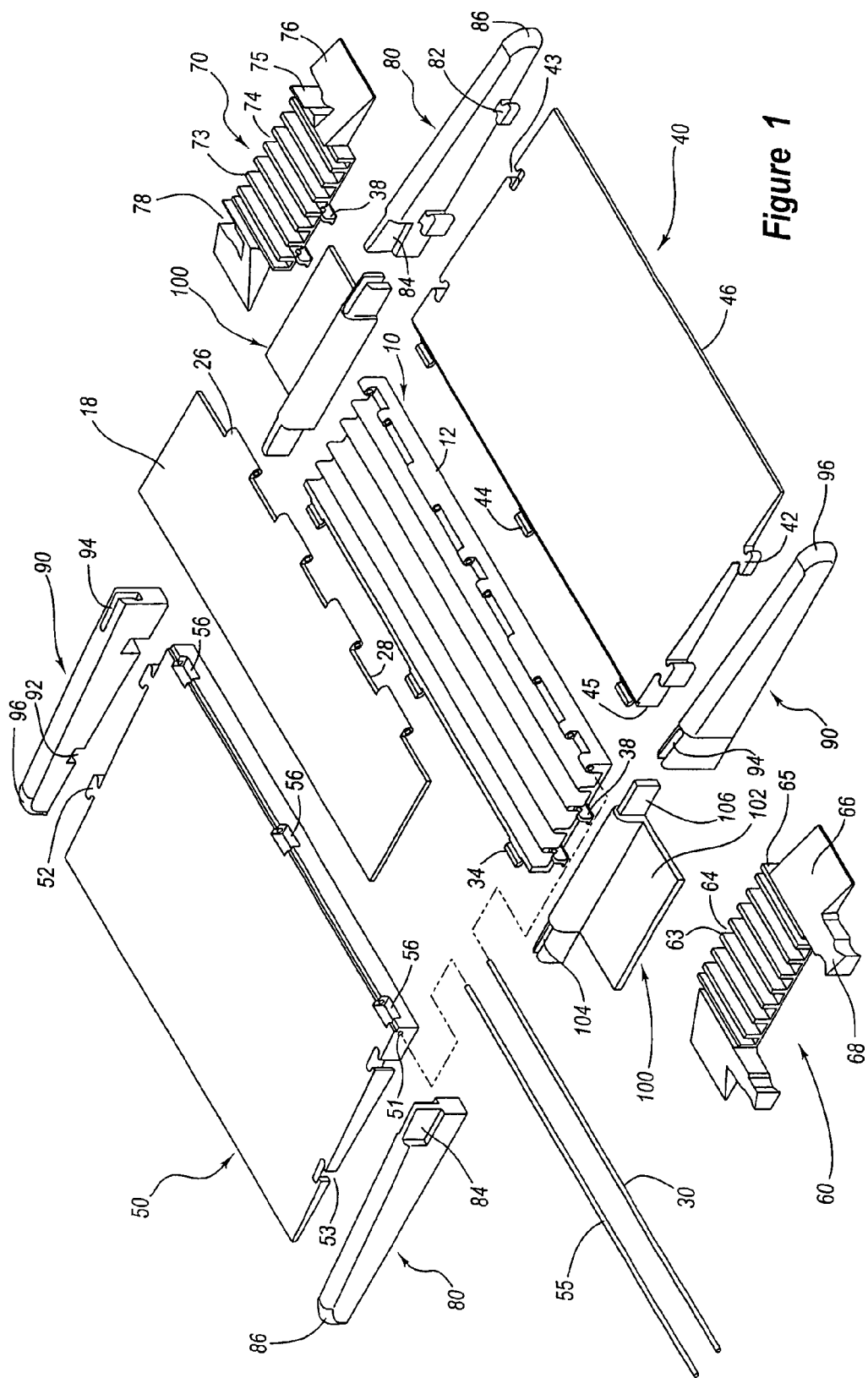
FIG. 1 is an exploded top view of an exemplary cable protection system according to at least one embodiment.

Throughout the drawings, identical reference characters and descriptions indicate similar, but not necessarily identical, elements. While the present invention is susceptible to various modifications and alternative forms, specific embodiments have been shown by way of example in the drawings and will be described in detail herein. However, one of skill in the art will understand that the present invention is not intended to be limited to the particular forms disclosed. Rather, the invention covers all modifications, equivalents and alternatives falling within the scope of the invention as defined by the appended claims.

DETAILED DESCRIPTION OF PREFERRED EMBODIMENTS

Figure 2:
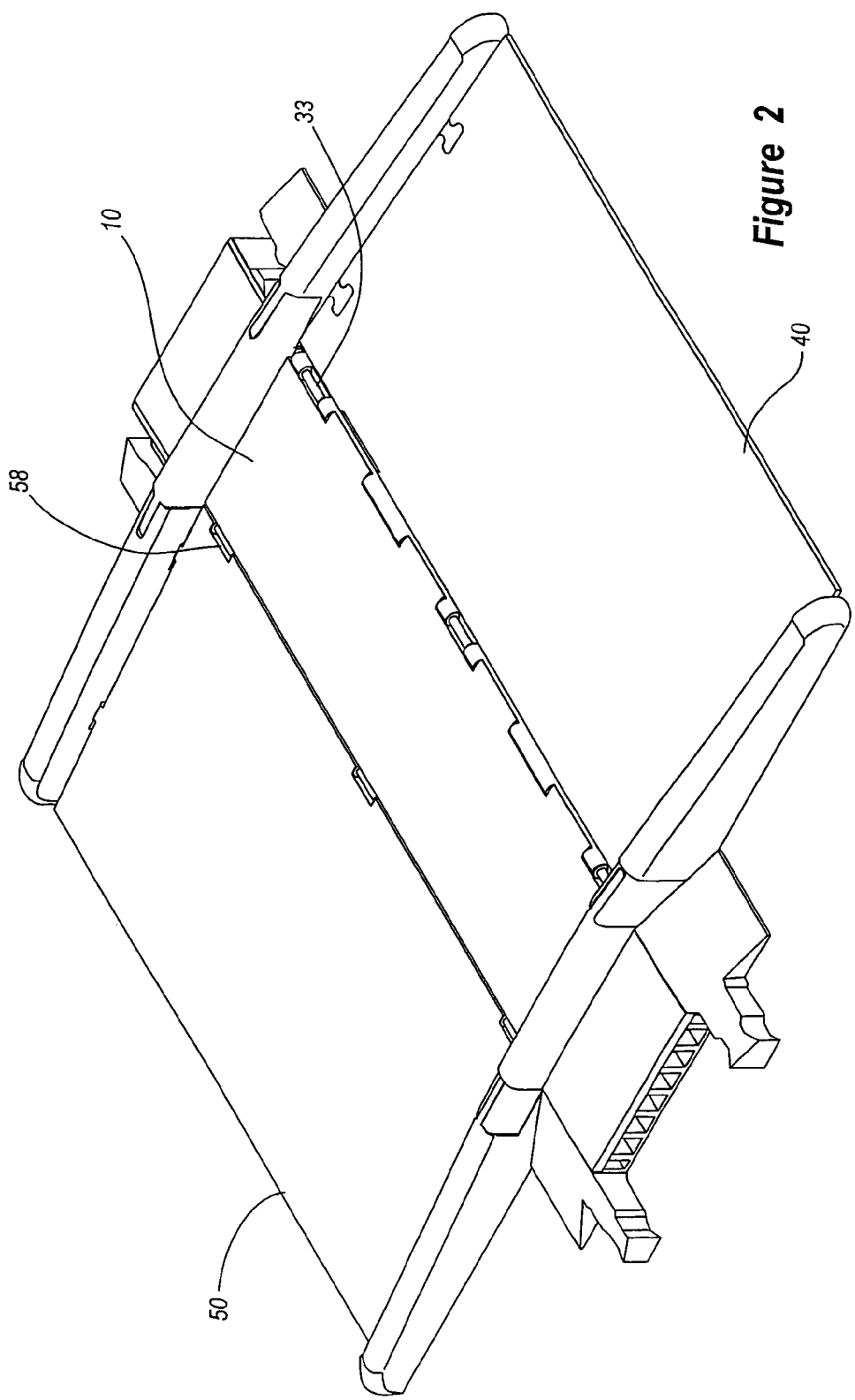
FIG. 2 is an assembled top view of the exemplary cable protection system illustrated in FIG. 1.

FIG. 1 is an exploded top view of an exemplary cable protection system according to at least one embodiment. FIG. 2 is an assembled top view of the exemplary cable protection system illustrated in FIG. 1. In one embodiment, the exemplary cable protection system illustrated in these figures comprises a pair of ramps 40, 50 that are removably and pivotally attachable to a cable protector 10.

Figure 3:
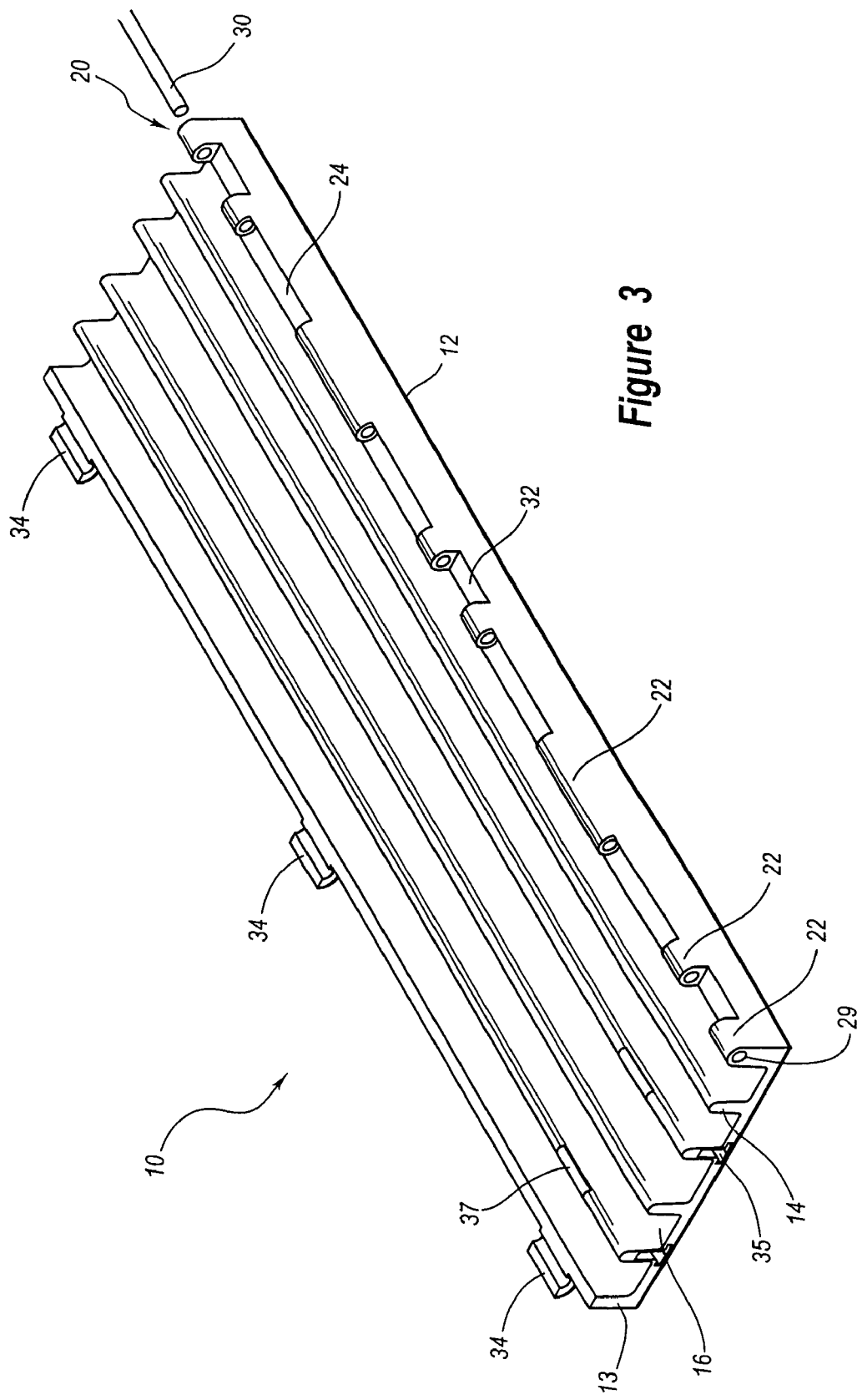
FIG. 3 is a detailed view of an exemplary base member for a cable protector according to at least one embodiment.

As seen in FIGS. 1 and 3, in certain embodiments cable protector 10 comprises a base member 12 having a pair of opposing side walls 13. Base member 12 may be substantially rectangular, as illustrated in FIGS. 1-3, or formed in any number of other shapes or sizes, such as a square or other multi-sided shape. As seen in the end view of FIG. 4A, in one embodiment opposing side walls 13 are substantially vertically extending.

In certain embodiments, opposing side walls 13 form a single channel within base member 12 for housing one or more cables. Alternatively, as illustrated in FIG. 3, one or more vertically extending rib members 14 may longitudinally divide the length of base member 12 into a plurality of longitudinal channels 16 for housing one or more cables. As seen in FIG. 4A, rib member 14 may be formed so as to have a height that is generally coextensive with the height of the side walls 13 of base member 12.

Advantageously, when a plurality of cables are housed within base member 12, rib members 14 act as barriers between the longitudinally extending cables to minimize tangling, electrical interference, and the like. As detailed above, numerous forms of cables and wires may be housed within base member 12; including, for example, data cables, hoses, electrical wiring, telephone cables, conduits, optical fibers, pneumatic tubing, plumbing, and any other length of material.

In the exemplary embodiments illustrated in FIGS. 1-3, a cover 18 may be pivotally attached to base member 12 by a hinge structure 20. In this exemplary embodiment, hinge structure 20 may comprise a plurality of alternately spaced hinge members 22 formed on an upper surface of one of the side walls 13 of base member 12, and a plurality of alternately spaced hinge members 26 formed on one side of cover 18. In certain embodiments, hinge members 22 and 26 are formed in a hollow, tubular shape so as to be capable of housing a cylindrical or rod-like member, such as a hinge rod or pin. Although illustrated in FIGS. 1-3 as a substantially continuous hinge structure, hinge structure 20 may also be formed of any number of hinge structures known to those of skill in the art; including, for example, a flush hinge, a barrel hinge, a butt hinge, or a concealed hinge.

As seen in FIG. 3, hinge members 22 may be spaced along side wall 13 of base member 12 so as to mate with an equal number of recesses 28 of similar dimension defined along the side of cover 18 (illustrated in FIG. 1). Similarly, hinge members 26 may be spaced along the side of cover 18 so as to mate with an equal number of recesses 24 of similar dimension defined along the upper surface of side wall 13 of base member 12. The lengths, widths and depths of recesses 24, 28 may be defined to be slightly larger than those of hinge members 22, 26, respectively, in order to allow hinge members 22, 26 to be easily inserted into recesses 24, 28. When properly mated and aligned, hinge members 22, 26 define a substantially continuous passageway 29 extending throughout the length of the aligned hinge members. In certain embodiments, passageway 29 is defined so as to be substantially cylindrical.

In at least one exemplary embodiment, a rod member 30 is inserted throughout the passageway 29 defined by the aligned hinge members 22, 26 to pivotally hinge cover 18 to base member 12. Although rod member 30 may be formed to be substantially cylindrical, rod member 30 may also be formed of any structure or shape capable of hinging opposing structures. The various elements of hinge structure 20 thus enable cover 18 to freely pivot about rod member 30 as cable protector 10 is opened and closed. When in a closed position, cover 18 advantageously rests upon the upper surfaces of side walls 13 and/or rib members 14 to cover channels 16 and to protect any cables housed therein.

As best seen in FIG. 3, in certain exemplary embodiments one or more cutout recesses 32 are defined along the upper surface of side wall 13 in base member 12. Although cutout recesses 32 may be spaced along side wall 13 in any number of ways and patterns, in at least one embodiment cutout recesses 32 are defined between adjacent hinge members 22 formed along the side wall 13 of base member 12. Further, cutout recesses 32 may be spaced along the side wall 13 of base member 12 so as to directly oppose recesses 28 spaced along the side of cover 18. Optionally, cutout recesses 32 serve to expose one or more portions 33 of rod member 30 (best seen in FIG. 2), even when rod member 30 is housed in the passageway 29 defined by aligned hinge members 22, 26. The depth and height of cutout recesses 32 may also be defined in side wall 13 so that the entire circumference of exposed rod portion 33 is exposed (FIG. 2).

As seen in the exemplary embodiments illustrated in FIGS. 1-2, a ramp 40 may be removably and pivotally attached to a side of cable protector 10. In at least one embodiment, ramp 40 comprises a tapered structure having one or more male end connectors 42 formed on one of its ends, and one or more female end connectors 43 formed on its opposing end. Generally speaking, end connectors 42, 43 may be formed of any shape or connecting structure known to those in the art; including, for example, T-shaped connectors, so-called dogbone-shaped connectors, complimentary block-shaped connectors, so-called tongue-and-groove connectors, hourglass-shaped connectors, and the like.

Ramp 40 may also comprise one or more pivot connectors 44 formed along a substantially vertical side wall 45 that opposes a tapered side 46 of the ramp. In certain embodiments, pivot connectors 44 horizontally extend from side wall 45 in a general hook-shaped manner so as to be removably and pivotably interlockable with an opposing structure, such as a similarly shaped hook member, or a rod or pin-like member. In the exemplary embodiment illustrated in FIGS. 1-2, pivot connectors 44 are formed in a hook shape so as to pivotally interlock with the exposed portions 33 of rod member 30 housed within hinge structure 20 of cable protector 10.

The number of pivot connectors 44 formed along the side of ramp 40 may be equal to the number of portions 33 of rod member 30 that are exposed by cutout recesses 32 in cable protector 10. In addition, each pivot connector 44 may be spaced along side wall 45 so as to pivotally interlock with an opposing exposed portion 33 of rod member 30 housed within hinge structure 20 of cable protector 10.

Although pivot connectors 44 are illustrated in FIGS. 1-2 as having a curvature that extends generally up and away from the ground, pivot connectors 44 may also be formed to have a curvature that extends generally downwards towards the ground. In addition, while pivot connectors 44 are illustrated in FIGS. 1-2 as being formed in a hook-like shape so as to be pivotally interlockable with the exposed portions 33 of rod member 30, pivot connectors 44 may also be formed of any number of other shapes or structures capable of pivotally interlocking with an opposing structure. For example, pivot connector 44 may be formed of a ball-shaped structure capable of pivotally interconnecting with a socket formed in the side wall 13 of base member 12, thereby forming a so-called ball-and-socket pivot joint.

According to at least one embodiment, ramp 40 is removably and pivotally attached to cable protector 10 by: 1) rotating cable protector 10 approximately ninety degrees from normal in the clockwise direction, 2) lowering cable protector 10 near ramp 40 such that the exposed portions 33 of rod member 30 interlock with pivot connectors 44, and then 3) rotating cable protector 10 approximately ninety degrees in the counter-clockwise direction. Persons of skill the art will recognize that any number of alternative methods and/or sequences may be used to removably and pivotally attach ramp 40 to cable protector 10, particularly in light of the various possible shapes, structures, and configurations of pivot connectors 44 and their opposing interlockable structures.

As seen in the exemplary embodiments illustrated in FIGS. 1-3, cable protector 10 may also comprise one or more pivot connectors 34 formed along a side wall 13 opposing cutout recesses 32. In certain embodiments, pivot connectors 34 horizontally extend from side wall 13 in a general hook-shaped manner so as to be removably and pivotably interlockable with an opposing structure, such as a similarly shaped hook member, or a rod or pin-like member. Similar to pivot connectors 44, pivot connectors 34 may be formed to have a curvature that extends generally up and away from the ground (as illustrated in FIG. 1), or downwards towards the ground. Pivot connectors 34 may also be formed of any number of other shapes or structures capable of pivotally interlocking with an opposing structure; including, for example, a ball-shaped structure capable of pivotally interconnecting with a socket to form a ball-and-socket joint.

In at least one embodiment, pivot connectors 34 are removably and pivotally attachable to one or more pivot structures (represented generally as element 51 in FIG. 1) formed in a ramp 50. Generally speaking, pivot structure 51 may be formed of any number of shapes or structures capable of pivotally interlocking with the various possible configurations of pivot connector 34 in cable protector 10, described in greater detail above. Examples of suitable configurations of ramp pivot structure 51 include an integrally or discretely formed metal or plastic pin partially extending along the side of ramp 50 (capable of interlocking with the hook-shaped embodiment of pivot connector 34), an exposed portion of a rod member housed within the side wall of ramp 50 (also capable of interlocking with the hook-shaped embodiment of pivot connector 34), and a socket (capable of pivotally interlocking with the ball-shaped embodiment of pivot connector 34).

In the exemplary embodiment illustrated in FIGS. 1 and 2, ramp pivot structure 51 comprises a rod member 55 inserted through and/or housed within a side wall of ramp 50. In this exemplary embodiment, one or more cutout recesses 56 are defined along the upper surface of the side wall of ramp 50 to expose portions 58 (best seen in FIG. 2) of rod member 55 housed within ramp 50. Although cutout recesses 56 may be spaced along the ramp's side wall in any number of ways and patterns, in certain embodiments cutout recesses 56 are spaced along the side wall of ramp 50 so as to directly oppose the pivot connectors 34 spaced along the side wall of cable protector 10. The depth and height of cutout recesses 56 may also be defined so that the entire circumference of exposed rod portion 58 is exposed.

In at least one embodiment, ramp 50 further comprises a tapered structure having one or more male end connectors 52 formed on one of its ends, and one or more female end connectors 53 formed on its opposing end. Generally speaking, end connectors 52, 53 may be formed of any suitable shape or connecting structure known to those in the art; including, for example, T-shaped connectors, so-called dog-bone-shaped connectors, complimentary block-shaped connectors, so-called tongue-and-groove connectors, hourglass-shaped connectors, and the like.

According to certain embodiments, ramp 50 is removably and pivotally attached to cable protector 10 by: 1) rotating ramp 50 approximately ninety degrees from normal in the clockwise direction, 2) lowering ramp 50 near cable protector 10 such that the exposed portions 58 of rod member 55 interlock with pivot connectors 34, and then 3) rotating ramp 50 approximately ninety degrees in the counter-clockwise direction. Any number of alternative methods and/or sequences may be used to removably and pivotally attach ramp 50 to cable protector 10, particularly in light of the various possible shapes, structures and configurations of pivot connector 34 and its opposing interlockable structure.

As best seen in FIGS. 3, 4A and 4B, one or more exemplary connector recesses 35 may be defined along the underside of one or both ends of the base member 12 of cable protector 10. In certain embodiments, as seen in FIGS. 3 and 4B, connector recesses 35 may be defined along the underside of the end of one or more of rib members 14 formed in base member 12. In particular, connector recesses 35 may be formed such that a protrusion on the end of a removable clip connector 38 (seen in FIG. 1) inserted into connector recess 35 extends up and through an opening 37 defined in rib member 14 to firmly, yet removably, connect clip connector 38 to cable protector 10. Connector recess 35 is generally defined and structured so as to substantially mirror the size and shape of the end of clip connector 38 on which the protrusion is formed.

Additionally or alternatively, one or more connector recesses 36 are generally defined and structured along the underside of one or both ends of base member 12, as seen in FIG. 4B. Similar to connector recesses 35, connector recesses 36 may be defined along the underside of the end of one or more of rib members 14 to substantially mirror the shape and size of the end of clip connector 38 that opposes the end on which the protrusion is formed.

Although removable clip connectors 38 are described as having opposing ends of differing shape, the ends of clip connectors 38 may also be formed to mirror one another. Similarly, although cable protector 10 is illustrated in FIG. 4B as having one pair of connector recess 35 defined on one end of cable protector 10 and one pair of connector recesses 36 defined on an opposing end, cable protector 10 may be formed to have connector recesses 35 defined in both of its ends, to have connector recesses 36 defined in both of its ends, or some alternative combination thereof.

The exemplary cable protection system illustrated in FIGS. 1 and 2 may also comprise a pair of laterally opposing end pieces 60, 70 removably attachable to the opposing ends of cable protector 10. In certain embodiments, male end piece 60 is removably attached to cable protector 10 by inserting the clip connectors 38 housed in the connector recesses 35 or 36 of cable protector 10 into one or more similarly formed connector recesses defined in end piece 60. Similar to connector recesses 35 and 36, these connector recesses may be defined along the underside of one end of end piece 60 to substantially mirror the shape and size of one of the ends of clip connector 38.

In the exemplary embodiment illustrated in FIGS. 1-2, male end piece 60 generally comprises a pair of substantially vertical opposing side walls 65. One or more vertically extending rib members 63 may longitudinally divide the length of male end piece 60 into a plurality of longitudinal channels 64 for housing one or more cables. Rib members 63 may be formed so as to have a height that is generally coextensive with the height of side walls 65 and may be spaced similarly to rib members 14 in cable protector 10. When male end piece 60 is removably attached to the end of cable protector 10, side walls 65 and rib members 63 advantageously serve to extend the length of the cable channels 16 defined within cable protector 10.

According to certain embodiments, male end piece 60 is formed to have a pair of laterally opposing side ramps 66. Although side ramps 66 may be integrally formed with male end piece 60, side ramps 66 may also be formed to be removably attachable to male end piece 60. Male end piece 60 may also be formed to have one or more male end connectors 68 for removably attaching male end piece 60 to additional end pieces, cable protectors, and the like. Generally speaking, male end connectors 68 may be formed of any suitable shape or connecting structure known to those in the art; including, for example, T-shaped connectors, so-called dogbone-shaped connectors, complimentary block-shaped connectors, so-called tongue-and-groove connectors, hourglass-shaped connectors, and the like.

Similar to male end piece 60, female end piece 70 may be removably attached to cable protector 10 by inserting clip connectors 38 housed in one or more connector recesses defined in end piece 70 into connector recesses 35 or 36 defined in the end of cable protector 10. As seen in FIGS. 1-2, female end piece 70 generally comprises a pair of substantially vertical opposing side walls 75. One or more vertically extending rib members 73 may longitudinally divide the length of female end piece 70 into a plurality of longitudinal channels 74 for housing one or more cables. As with rib members 63, rib members 73 may be formed so as to have a height that is generally coextensive with the height of side walls 75 and may be spaced similarly to rib members 14 in cable protector 10.

Similar to male end piece 60, female end piece 70 may be formed to have a pair of laterally opposing side ramps 76. As with side ramps 66, side ramps 76 may be integrally formed with or removably attachable to female end piece 70. Female end piece 70 may also be formed to have one or more female end connectors 78 for removably attaching additional end pieces, cable protectors, and the like to female end piece 70. Female end connectors 78 may further be formed of any suitable shape or connecting structure, as known to those skilled in the art; including, for example, T-shaped connectors, so-called dogbone-shaped connectors, complimentary block-shaped connectors, so-called tongue-and-groove connectors, hourglass-shaped connectors, and the like.

In certain embodiments, the exemplary cable protection system illustrated in FIG. 1 may further comprise one or more edge rails 80, 90, and 100 removably attachable to the ends of ramps 40, 50 and cable protector 10. As seen in FIGS. 1-2, a tapered edge rail 80 having one or more male end connectors 82 may be removably attached to an end of ramps 40, 50 by inserting male end connectors 82 into the complimentary-shaped female end connectors 43, 53 respectively formed in ramps 40, 50. Similarly, a tapered edge rail 90 having one or more female end connectors 92 may be removably attached to an opposing end of ramps 40, 50 by inserting the ramp's male end connectors 42, 52 into the complimentary-shaped female end connectors 93 defined in edge rail 90.

In the exemplary embodiment illustrated in FIGS. 1-2, edge rails 80, 90 are respectively formed to have edge rail connectors opposing their curved ends 86, 96. According to this exemplary embodiment, the side walls of the end of edge rail 80 may be cut away to form a ridge 84, while a groove 94 may be defined at the end of edge rail 90. In at least one embodiment, ridge 84 of edge rail 80 is removably connectable to a complementary groove 104 defined in one end of a center edge rail 100. Similarly, groove 94 of edge rail 90 may be removably connectable to a complementary ridge-shaped connector 106 formed on the opposing end of center edge rail 100.

According to certain embodiments, center edge rail 100 comprises a planar end piece cover 102 positioned between edge rail connectors 104, 106. Planar end piece cover 102 may be formed so as to rest upon the upper surfaces of side walls 65, 75 and rib members 63, 73 of end pieces 60, 70 when center edge rail 100 is removably connected to edge rails 80, 90. In addition, the size and shape of planar end piece cover 102 may be chosen so as to completely cover the channels 64, 74 formed in end pieces 60, 70 to protect any cables housed therein.

Figure 5:
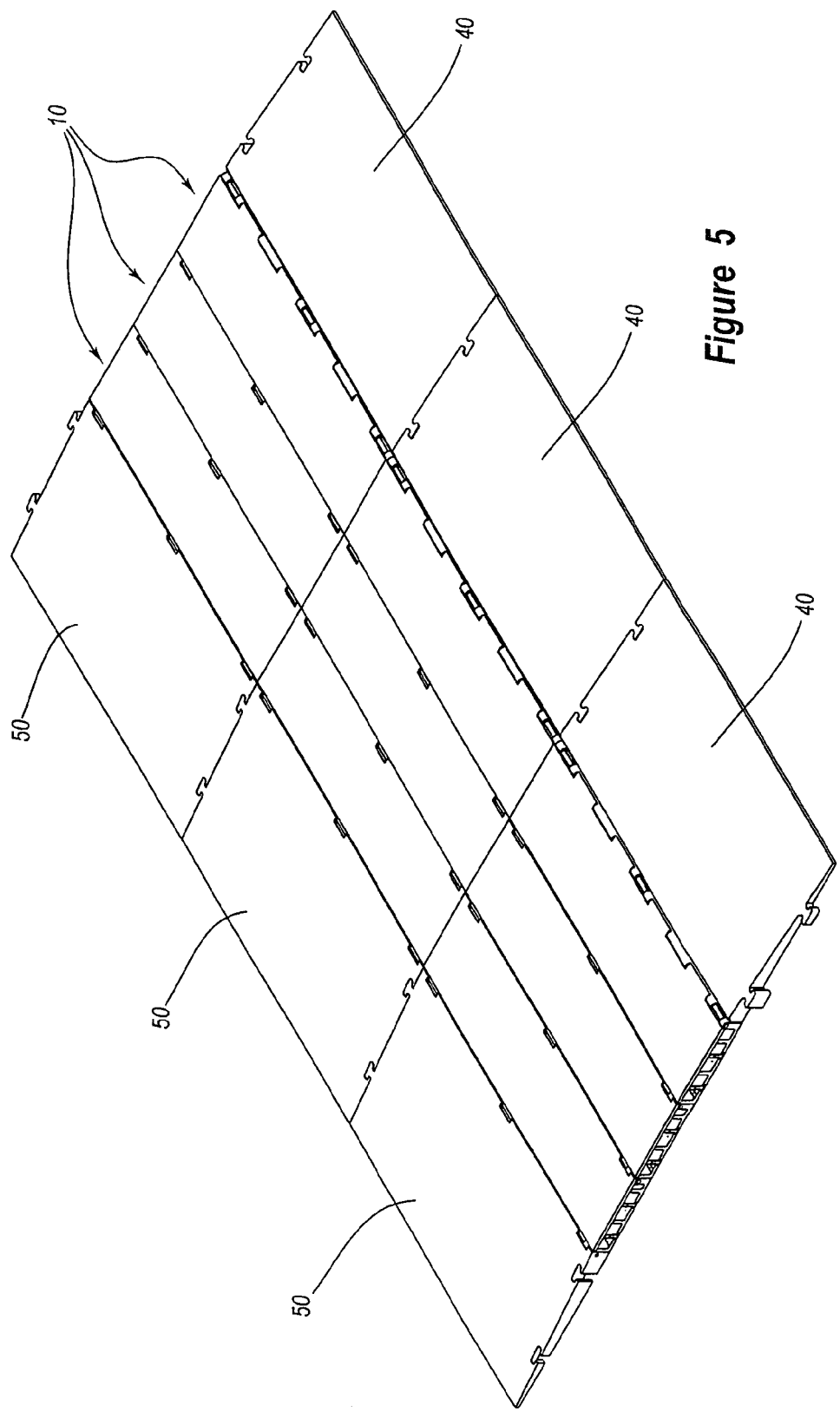
FIG. 5 is a top view of an exemplary arrangement of cable protectors and ramps.

FIG. 5 is a top view of an exemplary arrangement of cable protectors and ramps. As illustrated in this figure, an exemplary cable protection system may be adapted to house any number of cables and/or to extend over roadways and walkways of varying widths and lengths. For example, any number of cable protectors 10 may be removably and pivotally attached together in a side-by-side fashion so as to house greater or lesser numbers of cables. Specifically, as with the embodiment illustrated in FIG. 1, the pivot connectors of a first cable protector 10 may be removably and pivotally interlocked with the exposed portions of a rod member housed in a second cable protector 10 to removably and pivotally attach the two cable protectors together.

Similarly, any number of cable protectors 10 may be removably attached together in an end-to-end fashion so as to extend exemplary cable protection system across roadways or walkways of varying widths. Specifically, clip connectors housed in recesses of a first cable protector 10 may be inserted into recesses defined in a third cable protector 10 to removably attach the two cable protectors together, as seen in FIG. 5. If desired, further cable protectors 10 and/or ramps 40, 50 may be attached in various arrays to provide any suitable configuration in a simple and rapid manner.

Figure 6:
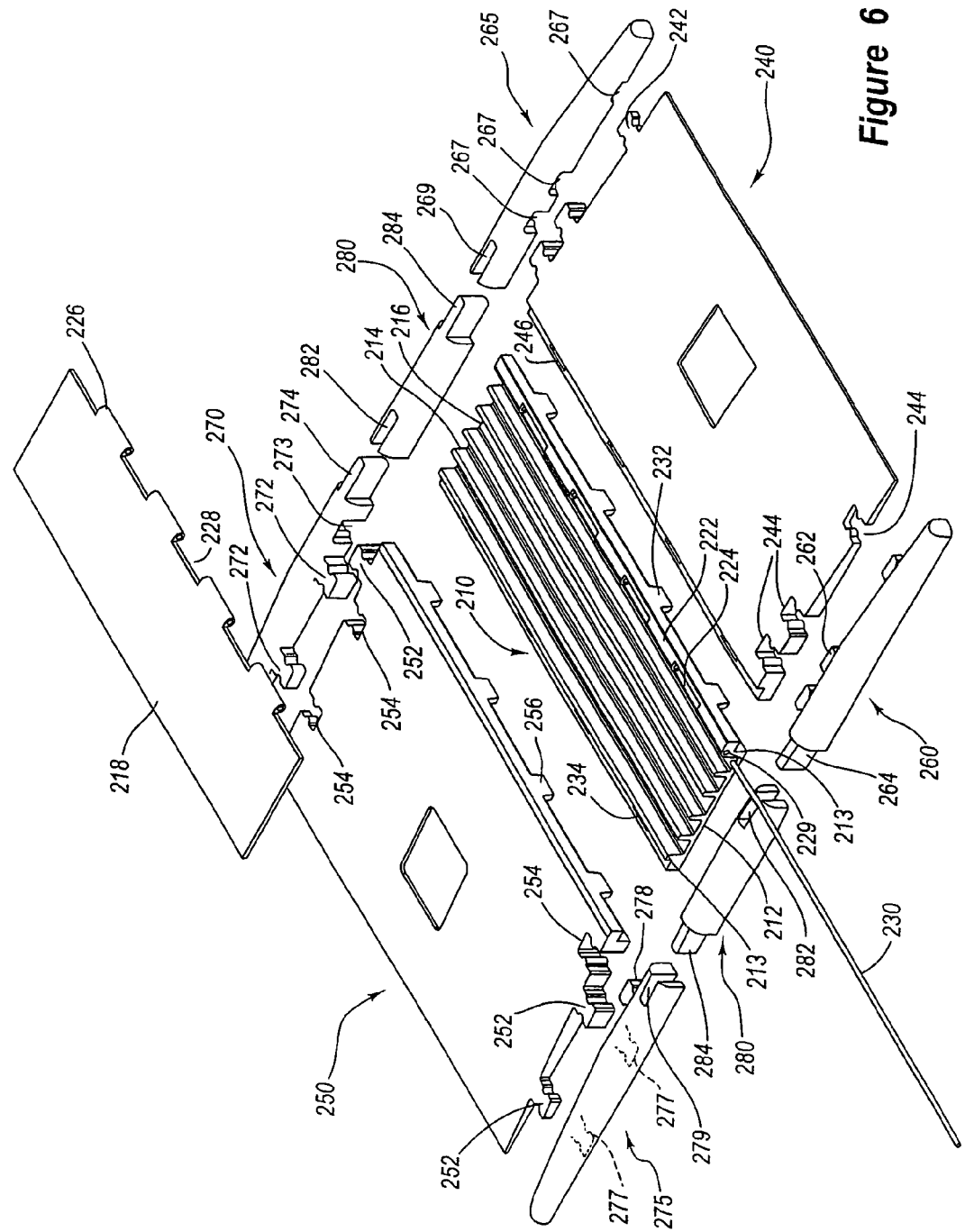
FIG. 6 is an exploded top view of an alternative cable protection system according to at least one embodiment.
Figure 7:
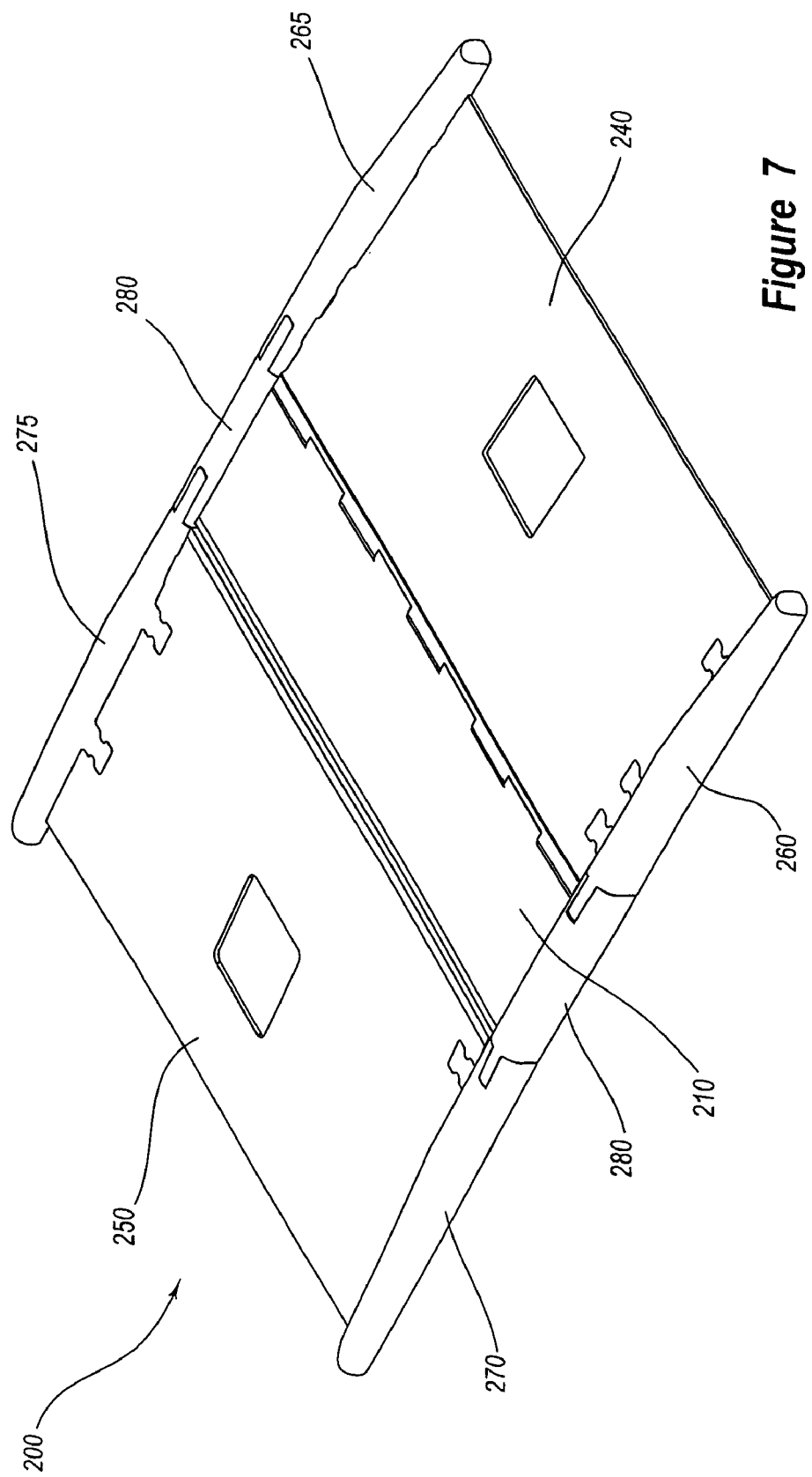
FIG. 7 is an assembled top view of the alternative cable protection system illustrated in FIG. 6.

FIG. 6 is an exploded top view of an alternative cable protection system 200 according to at least one embodiment. FIG. 7 is an assembled top view of the alternative cable protection system 200 illustrated in FIG. 6. In certain embodiments, exemplary cable protection system 200 comprises a pair of ramps 240, 250 that are removably attachable to a cable protector 210.

As seen in FIGS. 6 and 7, in some embodiments cable protector 210 comprises a base member 212 having a pair of opposing side walls 213. Base member 212 may be substantially rectangular, as illustrated in FIGS. 6 and 7, or formed in any number of other shapes or sizes, such as a square or other multi-sided shape. Opposing side walls 213 may form a single channel within base member 212 for housing one or more cables. Alternatively, as illustrated in FIGS. 6 and 7, one or more vertically extending rib members 214 may longitudinally divide the length of base member 212 into a plurality of longitudinal channels 216 for housing one or more cables.

Figure 8A:
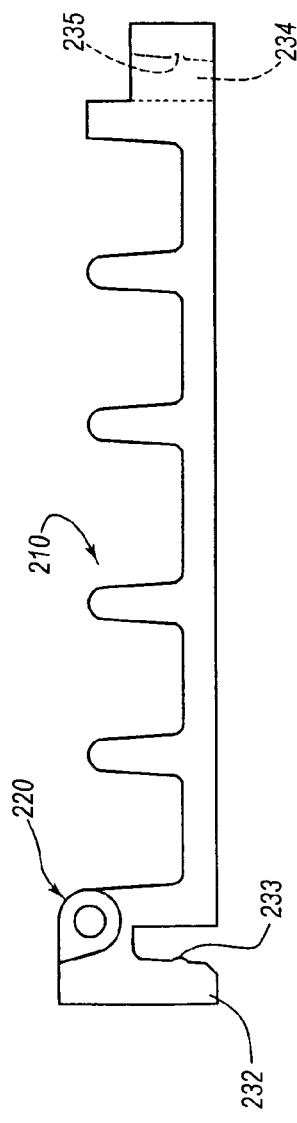
FIG. 8A is an end view of an alternative base member for a cable protector.

In the exemplary embodiment illustrated in FIGS. 6, 7, and 8A, a cover 218 may be pivotally attached to base member 212 by a hinge structure 220. In this exemplary embodiment, hinge structure 220 may comprise a plurality of alternately spaced hinge members 222 formed on an upper surface of one of the side walls 213 of base member 212, and a plurality of alternately spaced hinge members 226 formed on one side of cover 218. In certain embodiments, hinge members 222 and 226 are formed in a hollow, tubular shape so as to be capable of housing a cylindrical or rod-like member, such as a hinge rod or pin. Similar to hinge structure 20, hinge structure 220 may be formed of any number of hinge structures known to those of skill in the art; including, for example, a flush hinge, a barrel hinge, a butt hinge, or a concealed hinge.

Hinge members 222 may be spaced along side wall 213 of base member 212 so as to mate with an equal number of recesses 228 of similar dimension defined along the side of cover 218 (illustrated in FIG. 6). Similarly, hinge members 226 may be spaced along the side of cover 218 so as to mate with an equal number of recesses 224 of similar dimension defined along the upper surface of side wall 213 of base member 212. The lengths, widths and depths of recesses 224, 228 may be defined to be slightly larger than those of hinge members 222, 226, respectively, in order to allow hinge members 222, 226 to be easily inserted into recesses 224, 228. When properly mated and aligned, hinge members 222, 226 define a substantially continuous passageway 229 extending throughout the length of the aligned hinge members. In certain embodiments, passageway 229 is defined so as to be substantially cylindrical.

In at least one exemplary embodiment, a rod member 230 is inserted throughout the passageway 229 defined by the aligned hinge members 222, 226 to pivotally hinge cover 218 to base member 212. Although rod member 230 may be formed to be substantially cylindrical, rod member 230 may also be formed of any structure or shape capable of hinging opposing structures. The various elements of hinge structure 220 thus enable cover 218 to freely pivot about rod member 230 as cable protector 210 is opened and closed. When in a closed position, cover 218 advantageously rests upon the upper surfaces of side walls 213 and/or rib members 214 to cover channels 216 and to protect any cables housed therein.

As best seen in FIG. 8A, base member 212 may also comprise one or more connectors 232 to removably attach cable protector 210 to a side of ramp 240. In many embodiments, connectors 232 are substantially vertically oriented; that is, they extend generally perpendicular to the horizontal plane defined by cover 218. Although connectors 232 are illustrated in FIG. 8A as extending generally downwards towards the ground, connectors 232 may also be configured to extend generally up and away from the ground. Generally speaking, connectors 232 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to "snap fit" into a complimentary recess, or the like.

Figure 8B:
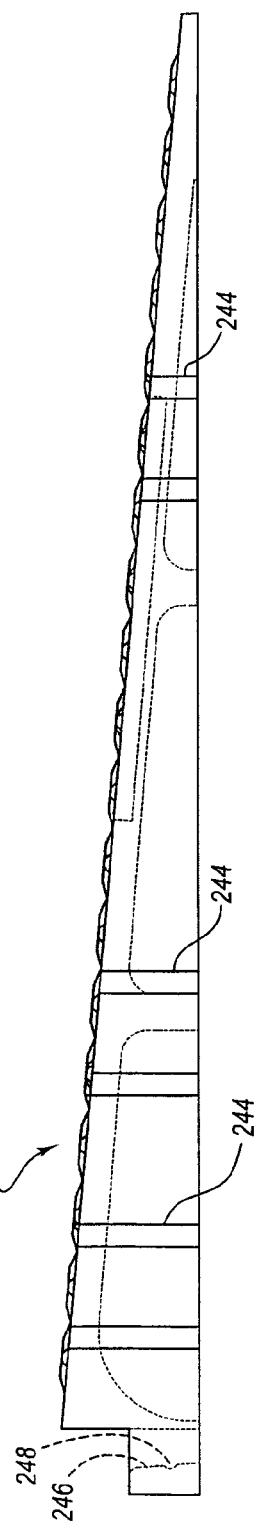
FIG. 8B is a side view of a ramp removably attachable to the base member illustrated in FIG. 8A.

In at least one embodiment, connectors 232 are configured to be insertable into one or more apertures 246 formed in ramp 240. As seen in FIG. 8B, in many embodiments apertures 246 are defined within ramp 240 so as to be substantially vertically oriented. According to this exemplary embodiment, apertures 246 are defined in a general slot shape that embodies the inverse of the dimensions of connectors 232. Alternatively, apertures 246 may be formed of any number of other shapes capable of receiving the various possible configurations of connectors 232 (described in greater detail above); including, for example, a circular socket (capable of interlocking with the ball-shaped embodiment of connector 232), a cubic or rectangular aperture or recess (capable of receiving the substantially vertical protrusion embodiment of connector 232), or the like.

In certain embodiments, connectors 232 may be configured to snap fit into apertures 246 defined in ramp 240 to removably attach cable protector to a side of ramp 240. Specifically, as illustrated in FIG. 8A, a coupling structure 233 may be formed on an inner surface of connector 232 and configured to snap fit into a complimentary-shaped coupling recess 248 (FIG. 8B) defined along the inner surface of aperture 246. According to many embodiments, coupling recess 248 is defined to have a shape that generally embodies the inverse of the shape of coupling structure 233. For example, as illustrated in FIGS. 8A-8B, coupling structure 233 may be configured as a substantially semi-circular protuberance, while coupling recess 248 may be defined as a substantially semi-circular recess. Accordingly, when connector 232 is inserted into aperture 246, coupling structure 233 may slidably engage (or snap fit into) coupling recess 248 to facilitate retention of connector 232 in aperture 246.

Although coupling structure 233 and coupling recess 248 have been described and illustrated with a certain degree of particularity, any number of complimentary shapes and sizes may be utilized to facilitate the snap fit connection described herein. For example, instead of being semi-circular in shape, coupling structure 233 and recess 248 may be triangular, rectangular, circular, square-shaped, or the like. In addition, recess 248 may extend deeper within the inner surface of aperture 246, while structure 233 may extend further outward from connector 232. As will be appreciated by those of skill in the art, modifying structure 233 and recess 248 in this manner correspondingly varies the amount of force required to break the snap fit connection established between these elements and withdraw connector 232 from aperture 246.

In at least one embodiment, ramp 240 comprises a tapered structure having one or more male end connectors 242 formed on one of its ends, and one or more female end connectors 244 formed on its opposing end. Although illustrated in FIGS. 6, 7, and 8B as being formed in a general hourglass shape, end connectors 242, 244 may be formed of any shape or connecting structure known to those in the art; including, for example, complimentary block-shaped connectors, so-called tongue-and-groove connectors, so-called dogbone-shaped connectors, T-shaped connectors, and the like.

According to at least one embodiment, cable protector 210 is removably attached to ramp 240 by: 1) elevating cable protector 210, 2) positioning connectors 232 of cable protector 210 directly over apertures 246 defined in ramp 240, 3) inserting connectors 232 into apertures 246 and lowering cable protector 210. Persons of skill the art will recognize that any number of alternative methods and/or sequences may be used to removably attach cable protector 210 to ramp 240, particularly in light of the various possible shapes, structures, and configurations of connectors 232 and apertures 246.

Figure 8C:
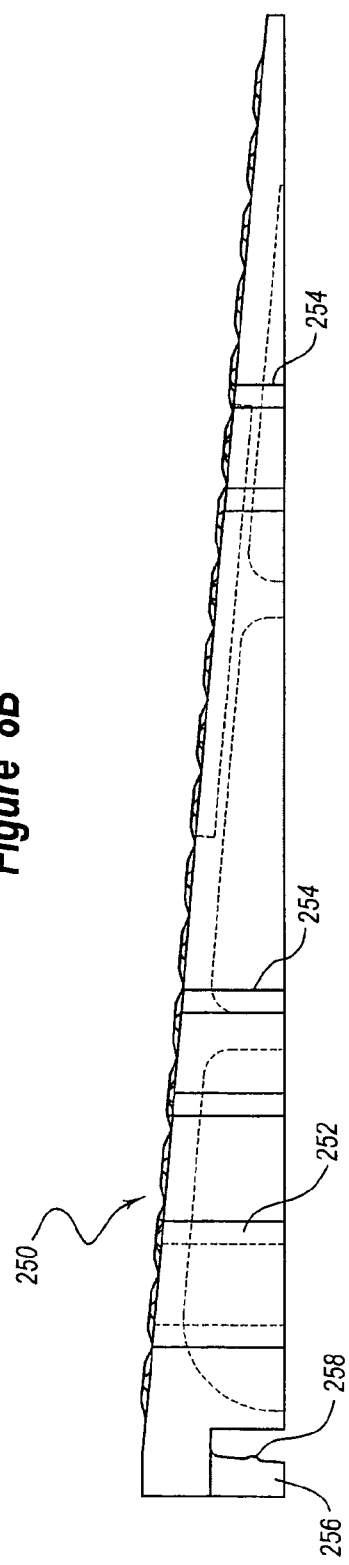
FIG. 8C is a side view of an additional ramp removably attachable to the base member illustrated in FIG. 8A.

As seen in the exemplary embodiments illustrated in FIGS. 6, 7, and 8C, a ramp 250 may be removably attached to a side of cable protector 210 that opposes the side attached to ramp 240. Similar to ramp 240, ramp 250 may comprise a tapered structure having one or more male end connectors 252 and one or more female end connectors 254 formed on its ends. Generally speaking, end connectors 252, 254 may be formed of any shape or connecting structure known to those in the art; including, for example, hourglass-shaped connectors, complimentary block-shaped connectors, so-called dogbone-shaped connectors, so-called tongue-and-groove connectors, T-shaped connectors, and the like.

As illustrated in FIGS. 6, 7, and 8C, ramp 250 may also comprise one or more connectors 256 formed along a substantially vertical side wall that opposes its tapered side. In many embodiments, connectors 256 are substantially vertically oriented. Although connectors 256 are illustrated in FIG. 8C as extending generally downwards towards the ground, connectors 256 may also be configured to extend generally up and away from the ground. As with connectors 232, connectors 256 may be formed of any number of shapes or structures capable of interlocking with, or being inserted into, an opposing structure; including, for example, a substantially vertically extending protrusion, a ball-shaped structure capable of interconnecting with a socket to form a ball-and-socket joint, a cantilever configured to snap fit into a complimentary recess, or the like.

In at least one embodiment, connectors 256 are configured to be insertable into one or more apertures 234 formed in base member 212 of cable protector 210. In many embodiments apertures 234 are defined within base member 212 so as to be substantially vertically oriented; that is, apertures 234 may be defined within base member 212 so as to extend generally perpendicular to the horizontal plane defined by cover 218. In the exemplary embodiment illustrated in FIG. 8A, apertures 234 are defined in a general slot shape that embodies the inverse of the dimensions of connectors 256. Alternatively, as with apertures 246, apertures 234 may be formed of any number of other shapes capable of receiving the various possible configurations of connectors 256 (described in greater detail above); including, for example, a circular socket (capable of interlocking with the ball-shaped embodiment of connector 256), a cubic or rectangular aperture or recess (capable of receiving the substantially vertical protrusion embodiment of connector 256), or the like.

In certain embodiments, connectors 256 may be configured to snap fit into apertures 234 defined in base member 212 to removably attach ramp 250 to cable protector 210. Specifically, as illustrated in FIGS. 8A and 8C, a coupling structure 258 may be formed on an inner surface of connector 256 and configured to snap fit into a complimentary-shaped coupling recess 235 defined along the inner surface of aperture 234. According to many embodiments, coupling recess 235 is defined to have a shape that generally embodies the inverse of the shape of coupling structure 258. For example, as illustrated in FIGS. 8A and 8C, coupling recess 235 may be defined as a substantially semi-circular recess, while coupling structure 258 may be configured as a substantially semi-circular protuberance. Accordingly, when connector 256 is inserted into aperture 234, coupling structure 258 may slidably engage (or snap fit into) coupling recess 235 to facilitate retention of connector 256 in aperture 234.

Although coupling structure 258 and coupling recess 235 have been described and illustrated with a certain degree of particularity, any number of complimentary shapes and sizes may be utilized to facilitate the snap fit connection described herein. For example, instead of being semi-circular in shape, coupling structure 258 and recess 235 may be triangular, rectangular, circular, or squared in shape. In addition, recess 235 may extend deeper within the inner surface of aperture 234, while structure 258 may extend further outward from connector 256. As will be appreciated by those of skill in the art, modifying structure 258 and recess 235 in this manner correspondingly varies the amount of force required to break the snap fit connection established between these elements and withdraw connector 232 from aperture 234.

According to at least one embodiment, ramp 250 is removably attached to cable protector 210 by: 1) elevating ramp 250, 2) positioning connectors 256 of ramp 250 directly over apertures 234 defined in base member 212 of cable protector 210, 3) inserting connectors 256 into apertures 234 and lowering ramp 250. Persons of skill the art will recognize that any number of alternative methods and/or sequences may be used to removably attach ramp 250 to cable protector 210, particularly in light of the various possible shapes, structures, and configurations of connectors 256 and apertures 234.

Since, in at least one embodiment, connectors 232, 256 and apertures 234, 246 are substantially vertically oriented, assembled cable protection system 200 is capable of withstanding larger torsional forces than conventional cable protection systems. Specifically, due to their substantially vertically oriented configuration, connectors 232, 256 are much more likely to be retained within apertures 234, 246 when a torsional force (such as one transferred from the wheel of a heavy or powered vehicle) is applied to ramps 240, 250 than if these connectors and apertures were horizontally oriented in a conventional configuration. In addition, the substantially vertical orientation of exemplary connectors 232, 256 and apertures 234, 246 results in a more efficient use of the materials used to form base member 212 of cable protector 210 since a substantial portion of the overall width of the cable protector is not devoted to non-cable-housing uses, as is the case with conventional horizontally oriented connectors. Thus, exemplary cable protection system 200 is typically much more narrow than conventional cable protectors of similar cable-housing capacity, resulting in decreased production costs and increased cable-housing capabilities.

In certain embodiments, exemplary cable protection system 200 further comprises one or more edge rails 260, 265, 270, 275, and 280 removably attachable to the ends of ramps 240, 250 and cable protector 210. As seen in FIGS. 6-7, tapered edge rail 260 may be removably attached to a first end of ramp 240 by inserting its male end connectors 262 into the complimentary-shaped female end connectors 244 formed in ramp 240, while tapered edge rail 265 may be removably attached to an opposing end of ramp 240 by inserting the male end connectors 242 formed on ramp 240 into the complimentary-shaped female end connectors 267 formed in rail 265. Similarly, tapered edge rail 270 may be removably attached to a first end of ramp 250 by its inserting male end connectors 272 into the female end connectors 254 of ramp 250 and by inserting the male end connector 252 of ramp 250 into female end connector 273 of rail 270. Tapered edge rail 275 may also be removably attached to an opposing end of ramp 250 by inserting its male end connector 278 into the female end connector 254 of ramp 250 and by inserting the male end connectors 252 of ramp 250 into the female end connectors 277 of rail 275.

In the exemplary embodiment illustrated in FIGS. 6-7, edge rails 260, 265, 270, and 275 are respectively formed to have edge rail connectors opposing their curved and tapered ends. According to this exemplary embodiment, the side walls of the connectors on edge rails 260 and 270 may be cut away to respectively form a ridge 264, 274, while a groove 269, 279 may be defined in the connector end of rails 265 and 275. In at least one embodiment, ridges 264, 274 are removably connectable to a complementary groove 282 defined in one end of a center edge rail 280. Similarly, grooves 269, 279 may be removably connectable to a complementary ridge-shaped connector 284 formed on the opposing end of center edge rail 280. As detailed above, attaching edge rails 260-280 to cable protector 210 and ramps 240, 250 in this manner helps restrain wheelchairs, strollers, walkers, and the like from falling off the edges of the cable protection system.

Figure 9:
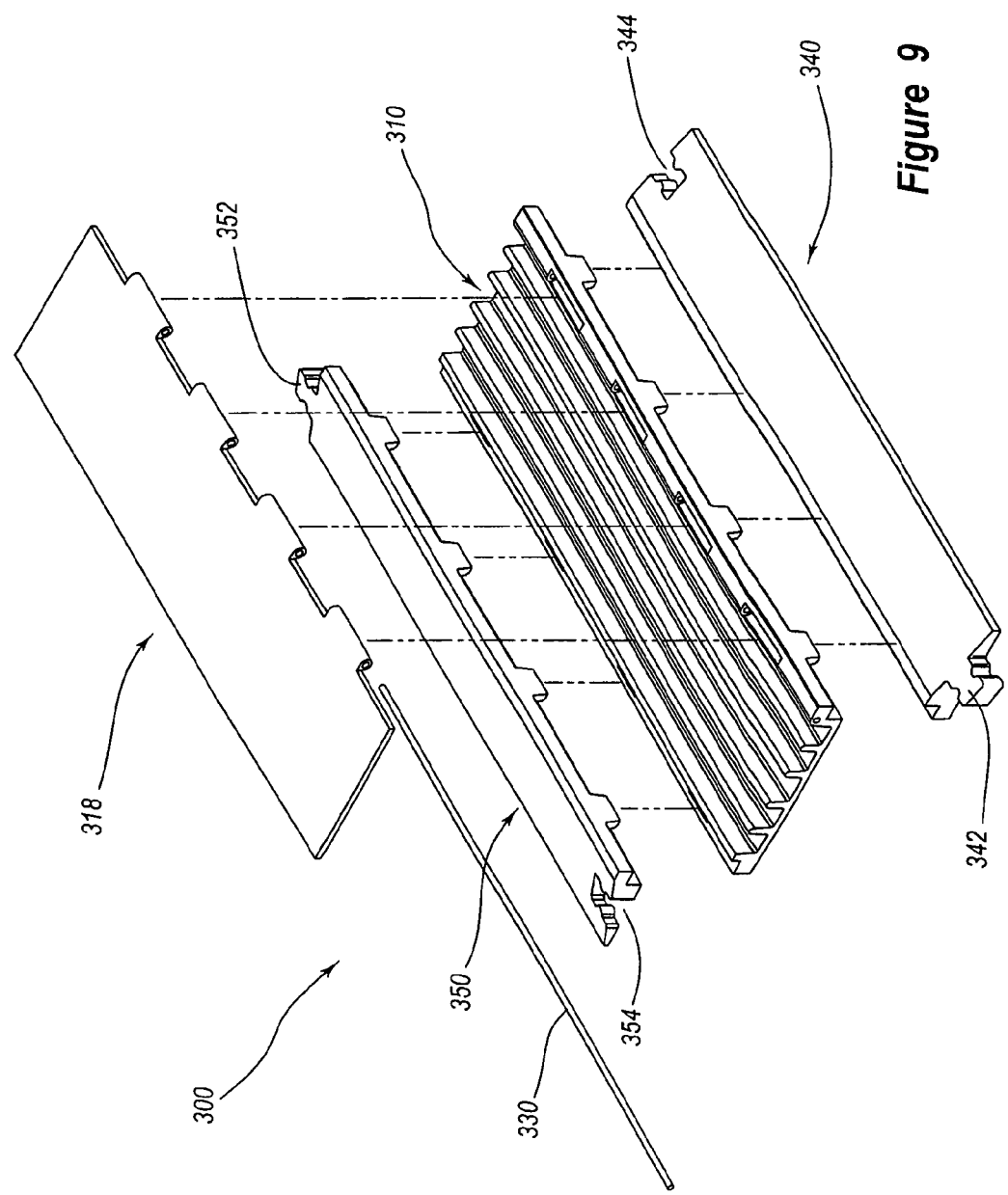
FIG. 9 is an exploded top view of an alternative cable protection system according to at least one embodiment.
Figure 10A:
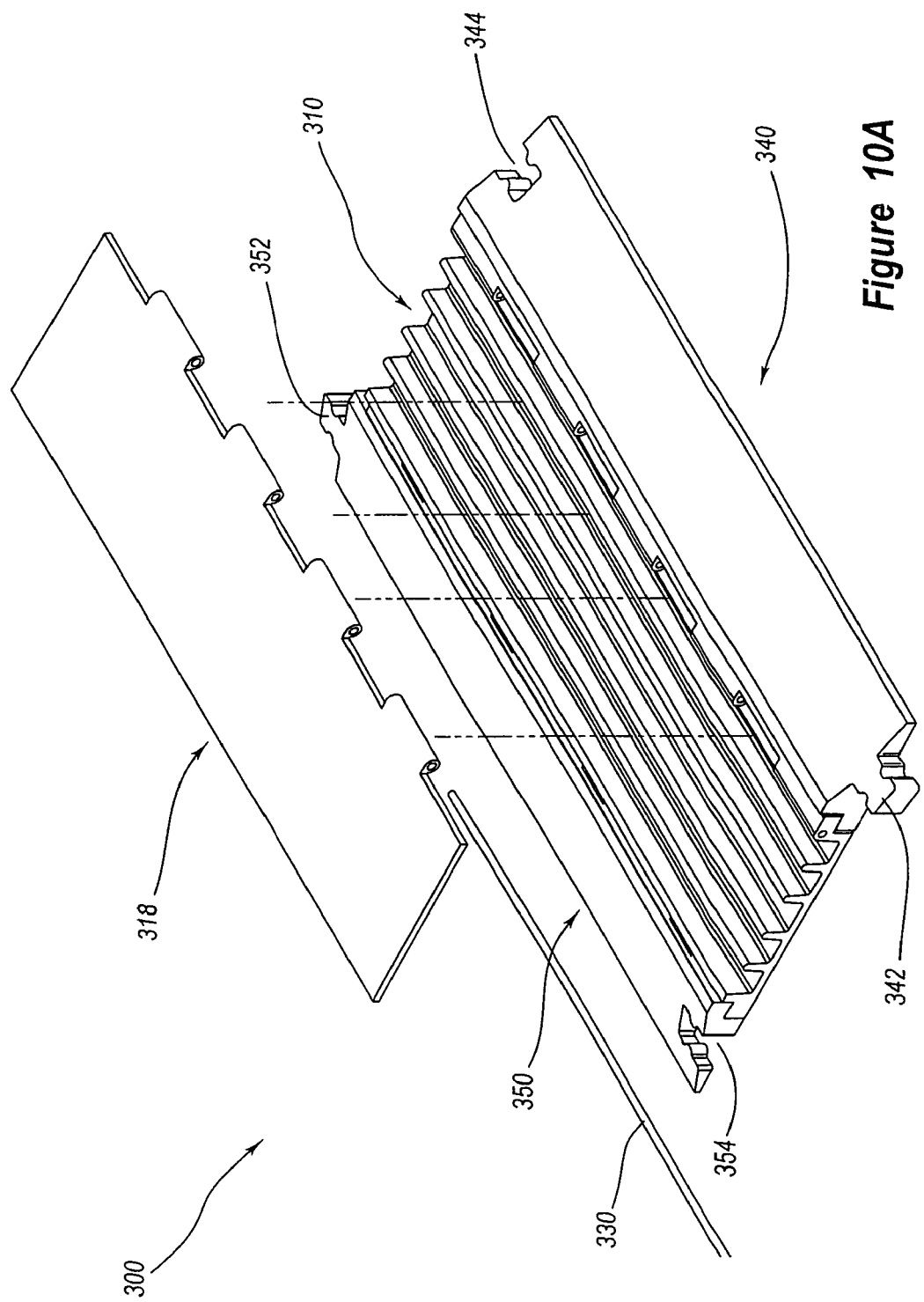
FIG. 10A is a partially assembled top view of the alternative cable protection system illustrated in FIG. 9.
Figure 10B:
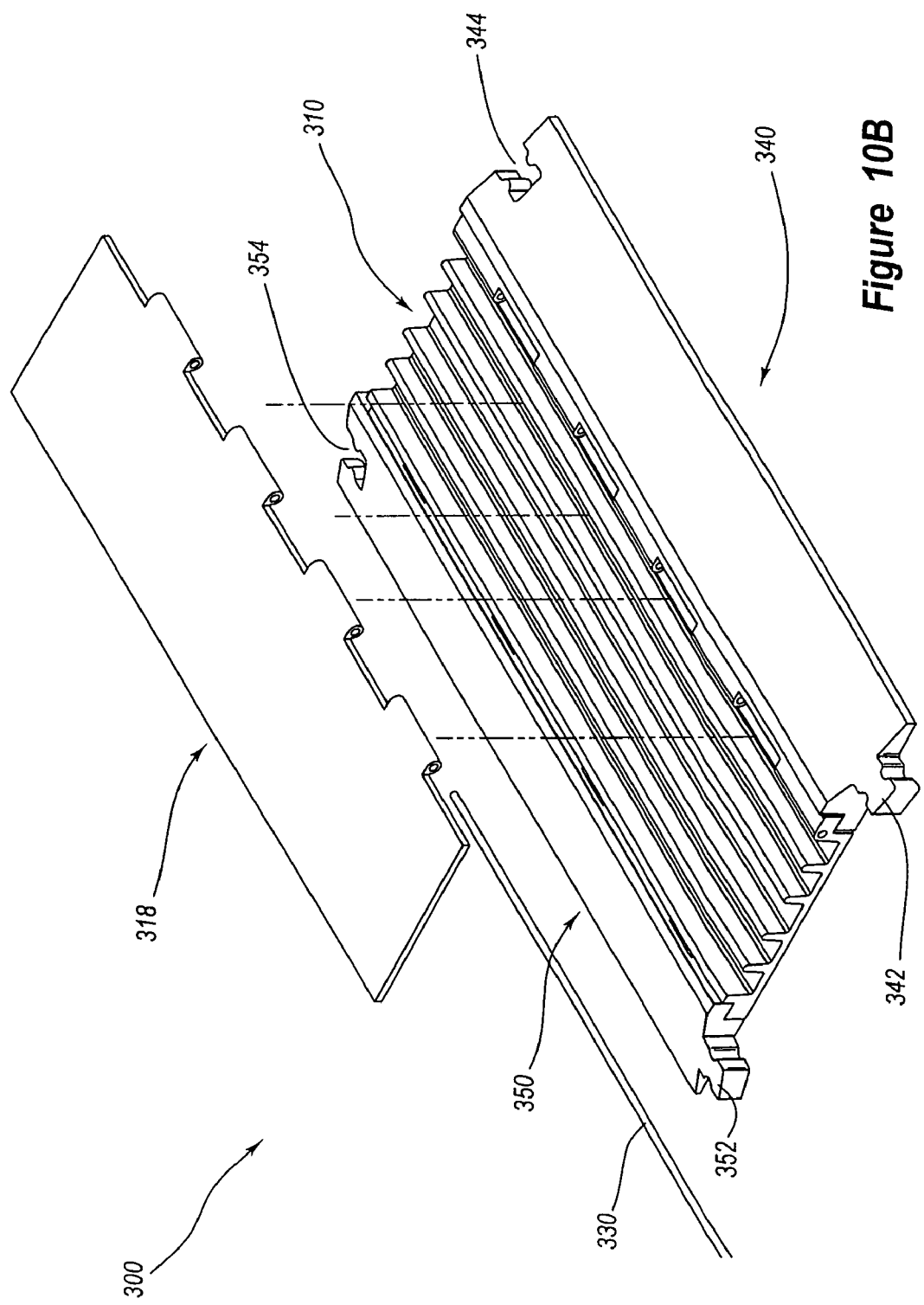
FIG. 10B is a partially assembled top view of an alternative embodiment of the cable protection system illustrated in FIG. 9.

Although the ramps illustrated in FIGS. 1-2, 5, 6-7, and 8B-8C have been described and illustrated as being formed to have a relatively gradual slope so that a wheelchair, walker or the like can pass over the cable protector with minimal effort, these ramps may also be formed of any number of suitable shapes, sizes, and slopes. For example, as illustrated in FIGS. 9, 10A, and 10B, ramps 340, 350 may be configured to have a slope that is significantly steeper than the slope of ramps 40, 50, 240, and 250. As with ramps 40, 50, 240, and 250, ramps 340 and 350 may be removably attachable to a cable protector 310. In addition, as with ramps 40, 50, 240, and 250, in at least one embodiment ramps 340 and 350 comprise one or more male end connectors 342, 352 and one or more female end connectors 344, 354 for facilitating the end-to-end connection of one or more ramps and/or one or more cable protectors. As with the end connectors described in connection with previous embodiments, male end connectors 342, 352 (and/or female end connectors 344, 354) may either be positioned on adjacent ends of ramps 340, 350 (as illustrated in FIG. 10B) or on opposing ends of ramps 340, 350 (as illustrated in FIG. 10A).

Figure 11:
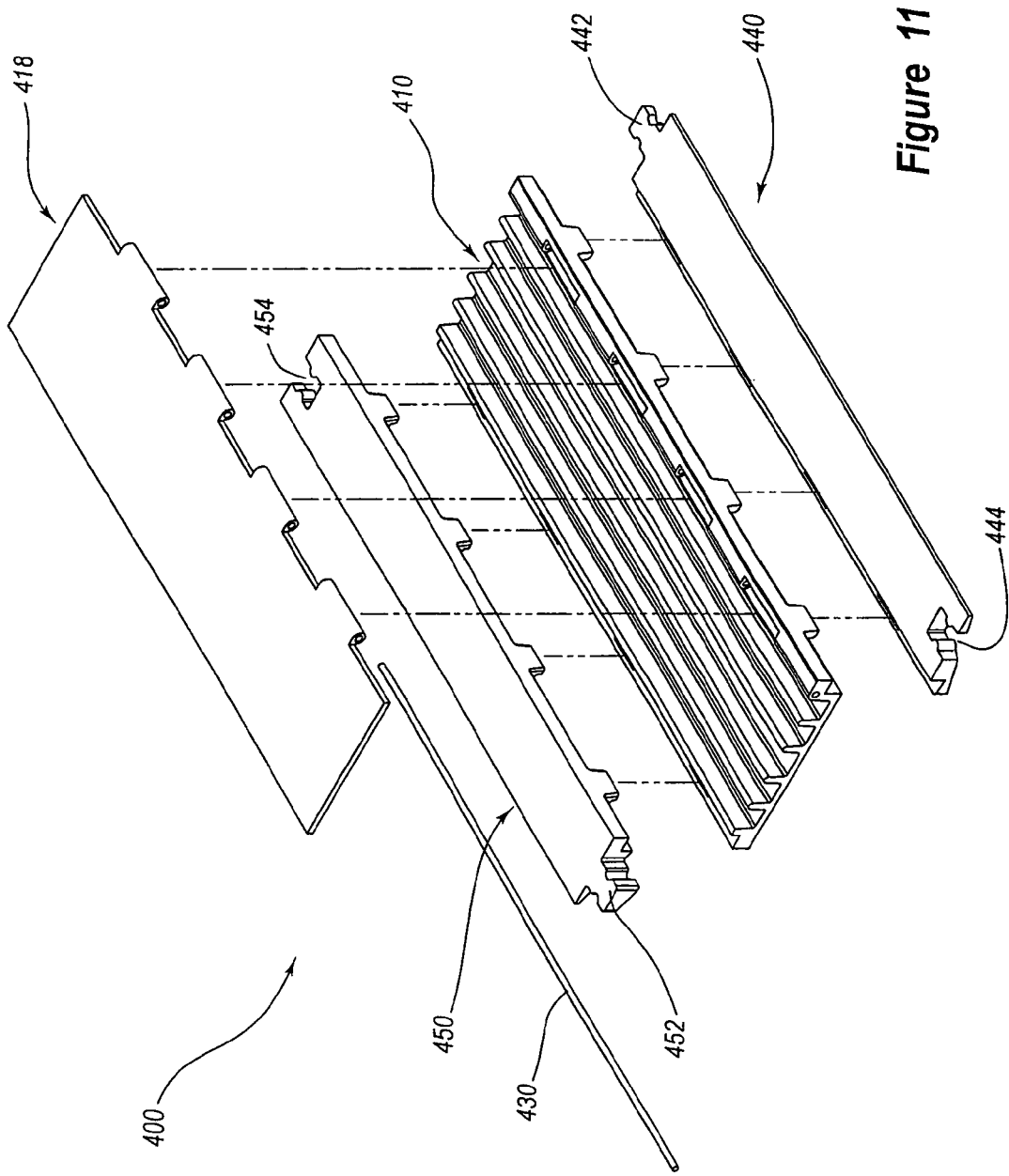
FIG. 11 is an exploded top view of an alternative cable protection system according to at least one embodiment.
Figure 12A:
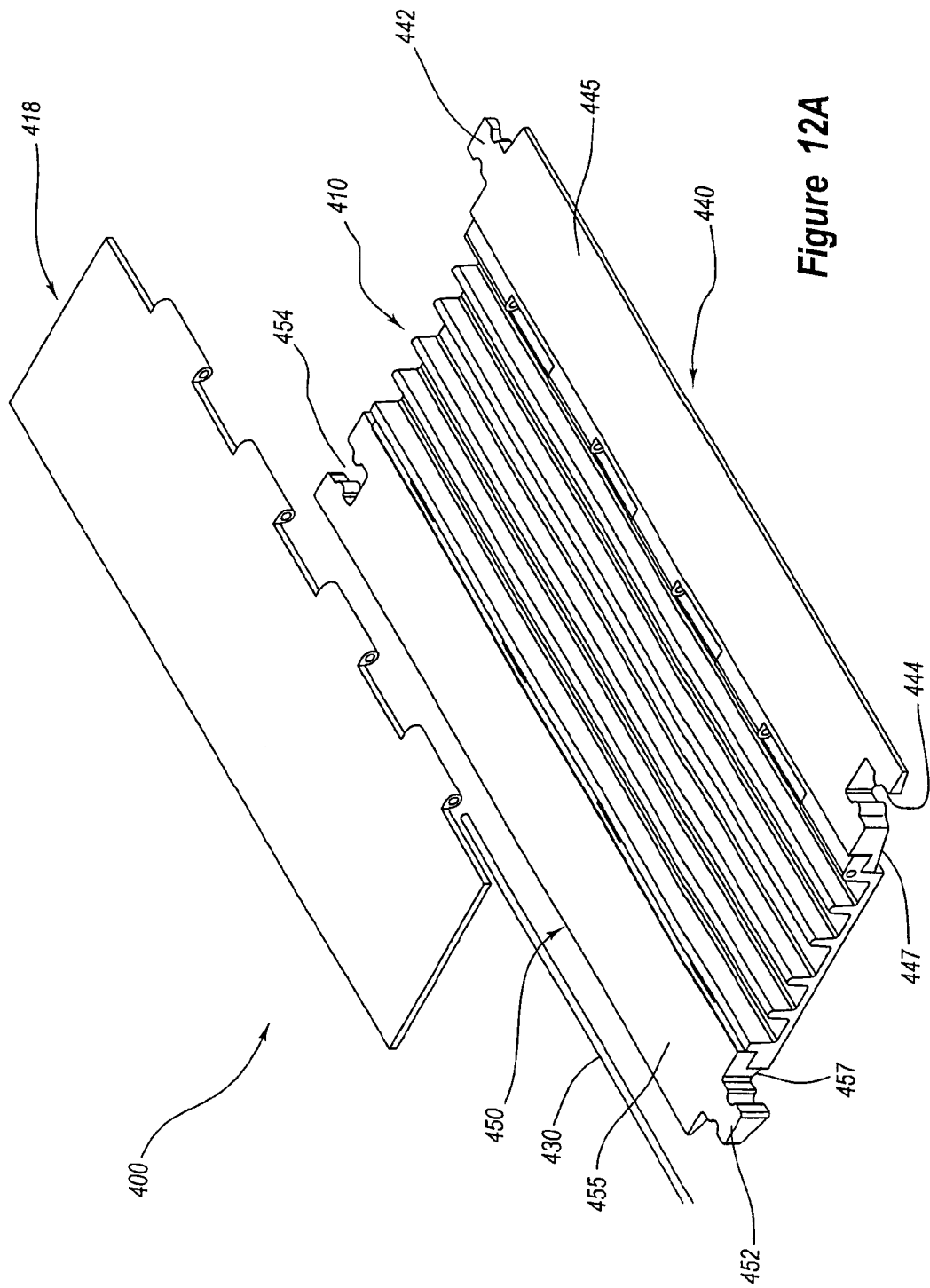
FIG. 12A is a partially assembled top view of the cable protection system illustrated in FIG. 11.
Figure 12B:
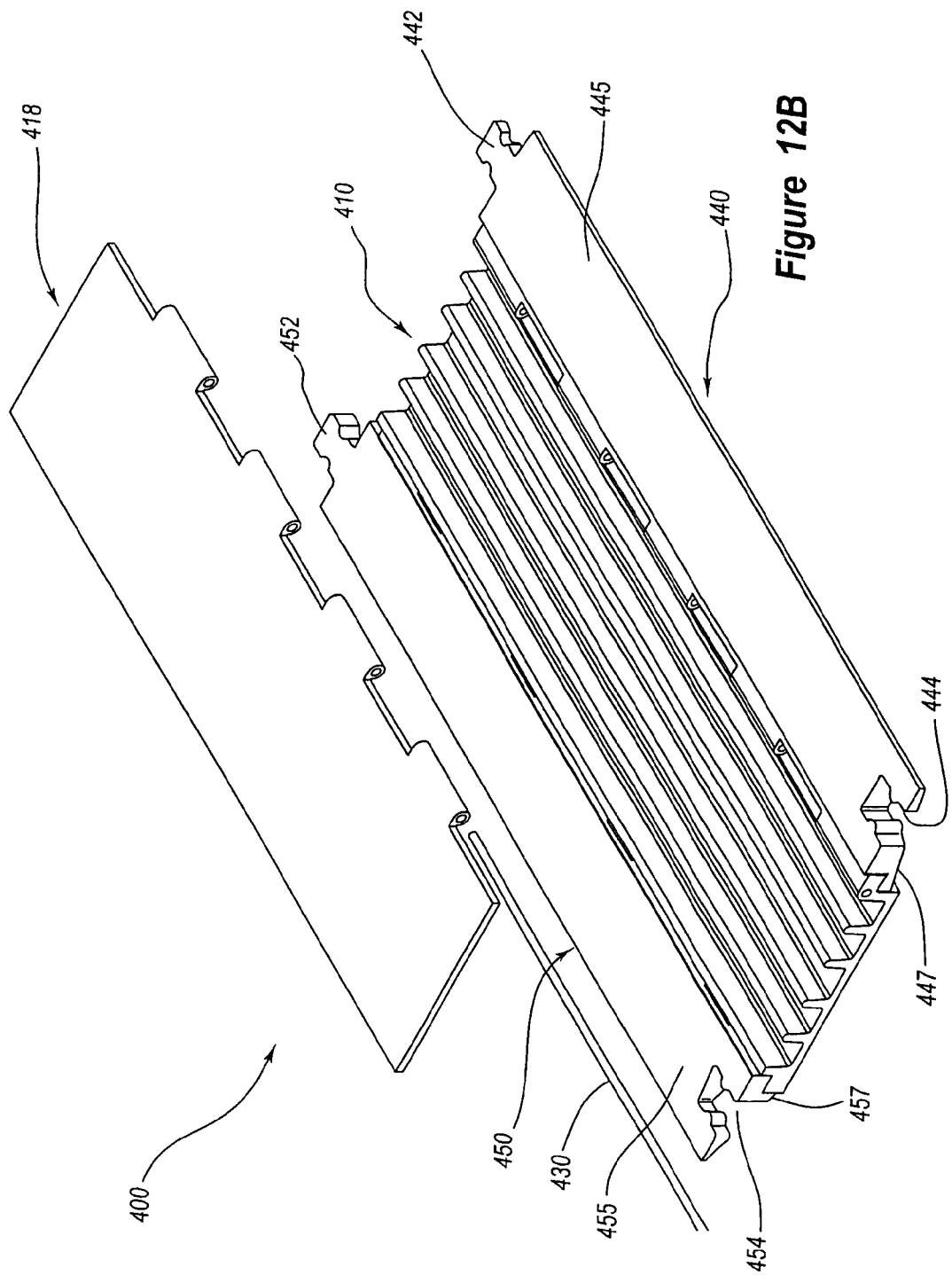
FIG. 12B is a partially assembled top view of an alternative embodiment of the cable protection system illustrated in FIG. 11.

FIG. 11 is an exploded top view of an alternative cable protection system 400 according to at least one embodiment. FIG. 12A is a partially assembled top view of alternative cable protection system 400. FIG. 12B is a partially assembled top view of an alternative embodiment of cable protection system 400. As seen in these figures, in certain embodiments exemplary cable protection system 400 comprises a pair of ramps 440, 450 configured to be removably attachable to a cable protector 410. According to some embodiments, ramps 440, 450 generally comprise tapered structures having one or more male end connectors 442, 452 and one or more female end connectors 444, 454 respectively formed on their ends. As with the end connectors described in previous embodiments, male end connectors 442, 452 (and/or female end connectors 444, 454) may either be positioned on adjacent ends of ramps 440, 450 (as illustrated in FIG. 12B) or on opposing ends of ramps 440, 450 (as illustrated in FIG. 12A). In contrast to the ramps illustrated in FIGS. 1-2, 5, 6-7, 8B-8C, 9, and 10A-10B, which generally taper down and away from the cable protector to which they are attached, ramps 440, 450 may be configured to taper generally up and away from cable protector 410. In other words, as seen in FIGS. 12A and 12B, in certain embodiments ramps 440, 450 may be configured to have a generally planar (i.e., flat or level) top surface 445, 455 and an angled (i.e., angled with respect to the horizontal plane defined by top surface 445, 455) bottom surface 447, 457, as opposed to having a generally planar bottom surface and angled top surface. When assembled, cable protector 410 and ramps 440, 450 collectively represent an "upside down" cable protector assembly.

In at least one embodiment, ramps 440, 450 are configured in this manner so as to laterally overlap the conventionally tapered sides of an additional ramp or an additional cable protector. For example, upwardly tapered ramps 440, 450 may be positioned to laterally overlap downwardly tapered ramps (such as ramps 340, 350). Generally speaking, configuring exemplary ramps 440, 450 in this manner enables a user to quickly and easily expand the lateral size of a cable protection system. Specifically, instead of having to insert, interconnect, or interlock various connectors or assembly structures to laterally attach a cable protector to an existing cable protection assembly in a side-by-side fashion, exemplary cable protection system 400 is configured such that a user need only slide cable protection system 400 towards a cable protection system or ramp having conventionally tapered sides until the angled bottom surfaces 447, 457 of upwardly tapered ramps 440 or 450 laterally overlap the top surfaces of the downwardly tapered existing cable protector or ramp.

Although both ramps 440 and 450 are illustrated in FIGS. 12A and 12B as having substantially planar top surfaces 445, 455 and angled bottom surfaces 447, 457, in some embodiments either ramp 440 or ramp 450 may be configured to have a conventionally angled top surface and a substantially planar bottom surface, similar to ramps 40, 50, 240, 250, 340, and 350. Specifically, ramp 440 may be configured to have a generally planar top surface 445 and an angled bottom surface 447, while ramp 450 may be removed and replaced with a ramp configured to have a generally planar bottom surface and an angled top surface, or vice versa. In addition, ramps 440, 450 may be formed to have a relatively steep slope (as illustrated in FIGS. 11, 12A, and 12B), or more of a gradual slope (as with ramps 40, 50 in FIGS. 1-2). As will be appreciated by those of skill in the art, mixing and matching ramps having differing shapes in this manner enables a user to modify exemplary cable protection system 400 so as be positionable between two conventionally tapered cable protection systems (such as systems 200 and 300), or between one "upside-down" cable protector and one conventionally tapered system (such as system 300 and another system 400). This exemplary "building block" configuration of system 400 thus increases the flexibility of the system as a whole, resulting in greater ease of use and interchangeability of parts.

As with ramps 40, 50 illustrated in FIG. 5, the exemplary cable protection systems illustrated in FIGS. 6-15 may be adapted to house any number of cables and/or to extend over roadways and walkways of varying lengths. For example, any number of cable protectors in these systems may be removably attached together in a side-by-side fashion so as to house greater or lesser numbers of cables. Specifically, connectors formed on the side of a first cable protector may be removably inserted into apertures defined in the side of a second cable protector to removably attach the two cable protectors together in a side-by-side fashion. Additional cable protectors may be attached to either side of this assembly to increase the cable-housing capacity of the system as needed.

Figure 13:
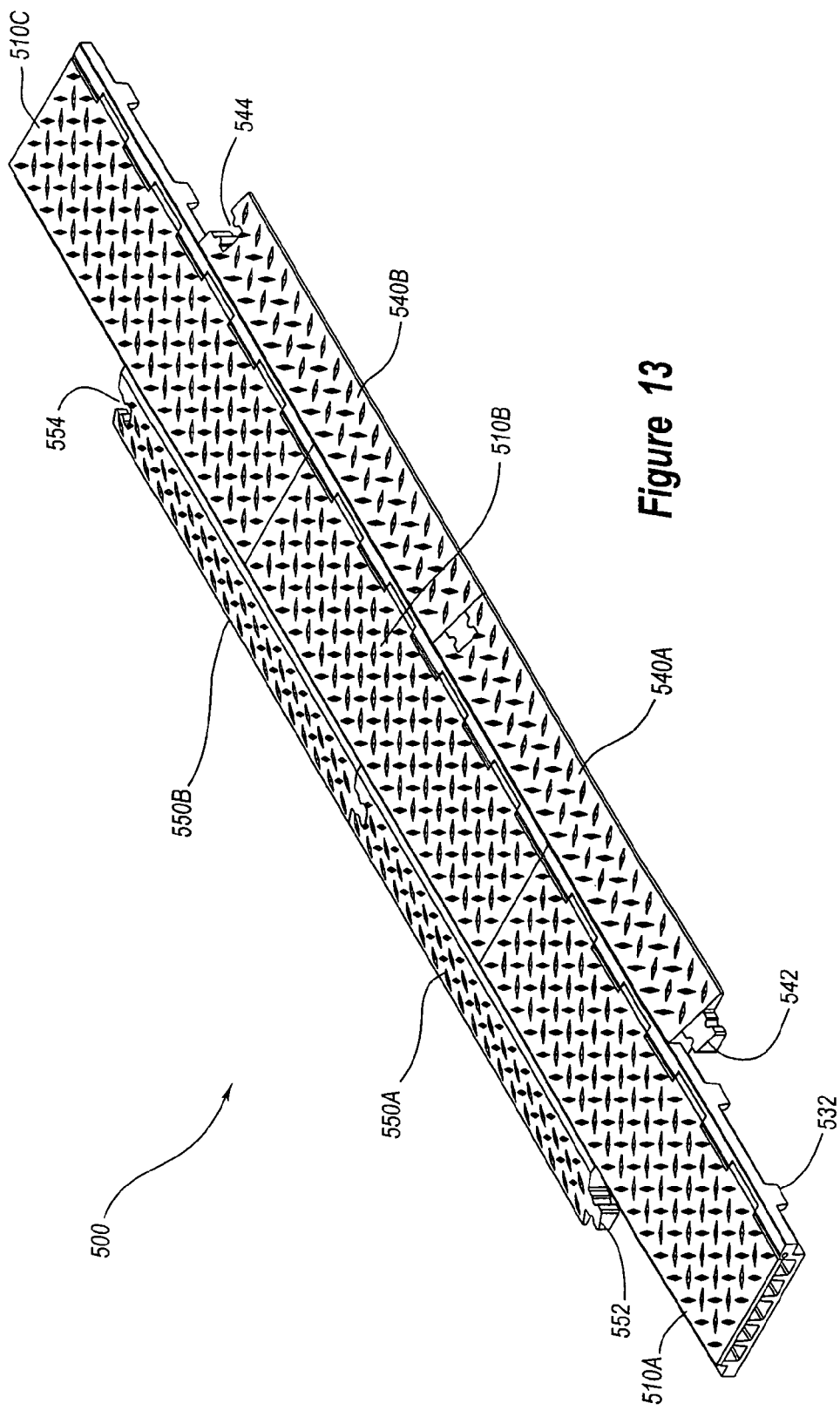
FIG. 13 is an assembled top view of an alternative cable protection system according to at least one embodiment.
Figure 15:
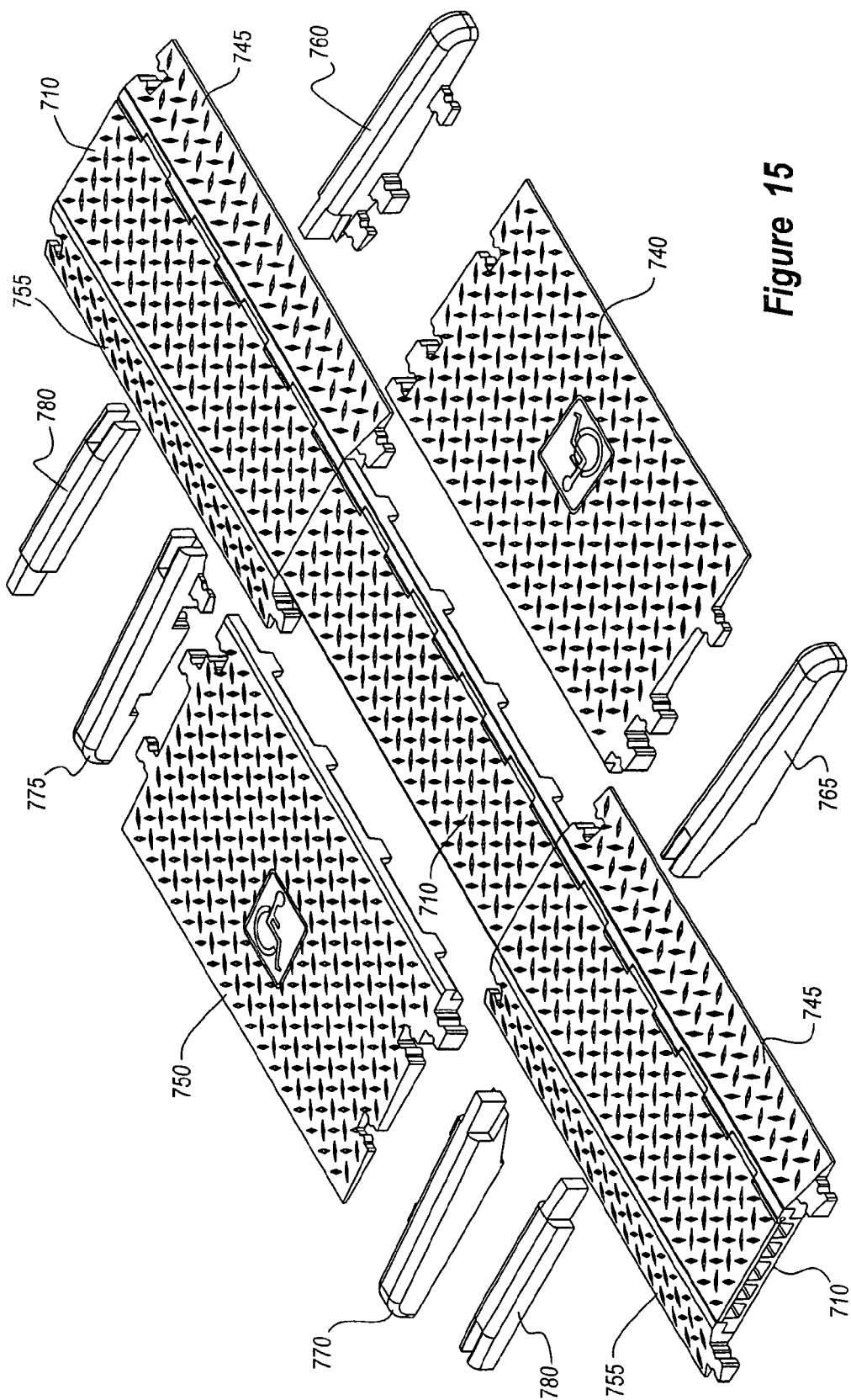
FIG. 15 is an exploded top view of an alternative cable protection system according to at least one embodiment.

Similarly, any number of cable protectors in systems 200, 300, and 400 may be removably attached together in an end-to-end fashion so as to extend these exemplary cable protection systems across roadways or walkways of varying widths. For example, as illustrated in FIG. 13, one or more cable protectors 510A-C may be removably attached together in an end-to-end fashion by staggering the manner in which ramps 540, 550 are connected. Specifically, after abutting the end of a first cable protector 510A against the end of a second cable protector 510B (as seen in FIG. 13), a first pair of ramps 540A, 550A may be removably attached to either side of the cable protectors so positioned, with the abutting ends of cable protectors 510A, 510B positioned near the centers of ramps 540A, 540B. As illustrated in FIG. 13, additional cable protectors (such as third cable protector 510C) may also be connected to either end of this assembly using one more additional ramps (such as the second pair of ramps 540B, 550B) in a similar manner to increase the length of the system as needed. Additionally or alternatively, cable protectors 510A-C may be removably attached together in an end-to-end fashion using one or more end connectors, such as clip connectors 38 illustrated in FIG. 1. As will be appreciated, one or more gradually sloped ramps and/or one or more steeply sloped ramps may be connected to the sides of the cable protectors connected together in this end-to-end fashion. For example, as illustrated in FIG. 15, one or more gradually sloped ramps 740, 750 and/or one or more steeply sloped ramps 745, 755 may be connected to the sides of a plurality of cable protectors 710 connected together end-to-end. In addition, as with the exemplary cable protection systems illustrated in FIGS. 1, 2, 6, and 7, one or more edge rails 760, 765, 770, 775, and 780 may be removably attached to the ends of ramps 740, 750.

As will be appreciated by those of skill in the art, mixing and matching the various "building blocks" of these exemplary cable protection systems in this manner enables a user to form a system capable of housing any number of cables and/or extending over roadways and walkways of varying lengths. The flexibility of the system as a whole is thus increased, resulting in greater ease of use and interchangeability of parts.

Although the various cable protectors embodiments illustrated in FIGS. 1-13 and 15 show a cover structure pivotally attached to a base member, various alternative arrangements and configurations fall within the scope of the present invention. For example, the cover structure may be snap fit or otherwise removably attached to the base member. Alternatively, the cable protector may comprise a unitary base member/cover structure having an open base for covering one or more cables. For example, as illustrated in FIGS. 14A and 14B, a cable protector 610 may comprise a cover structure 618 unitarily formed on the upper surface of a pair of opposing side walls 613. In certain embodiments, cover structure 618 and opposing side walls 613 define a single channel 616 for housing one or more cables. Additionally or alternatively, one or more vertically extending rib members (similar to rib members 14 in FIG. 4) may longitudinally divide the length of cable protector 610 into a plurality of longitudinal channels for housing one or more cables. Similar to cable protectors 210, 310, 410, and 510, cable protector 610 may also comprise one or more connectors 632 and/or apertures 634 for facilitating the side-by-side or end-to-end connection of additional ramps or cable protectors.

In addition, although the various cable protector embodiments illustrated in FIGS. 1-15 have been described as having one or more connectors formed on a first side of the base member and one or more apertures or exposed rod portions formed on an opposing side of the base member, various alternative arrangements and configurations fall within the scope of the present invention. For example, the base members may be formed with connectors on both sides, or it may have apertures or exposed rod portions defined in each of its sides. Similarly, the base members may be formed such that a connector is formed on the same side as an aperture or exposed pin or partial rod-member.

Figure 14:
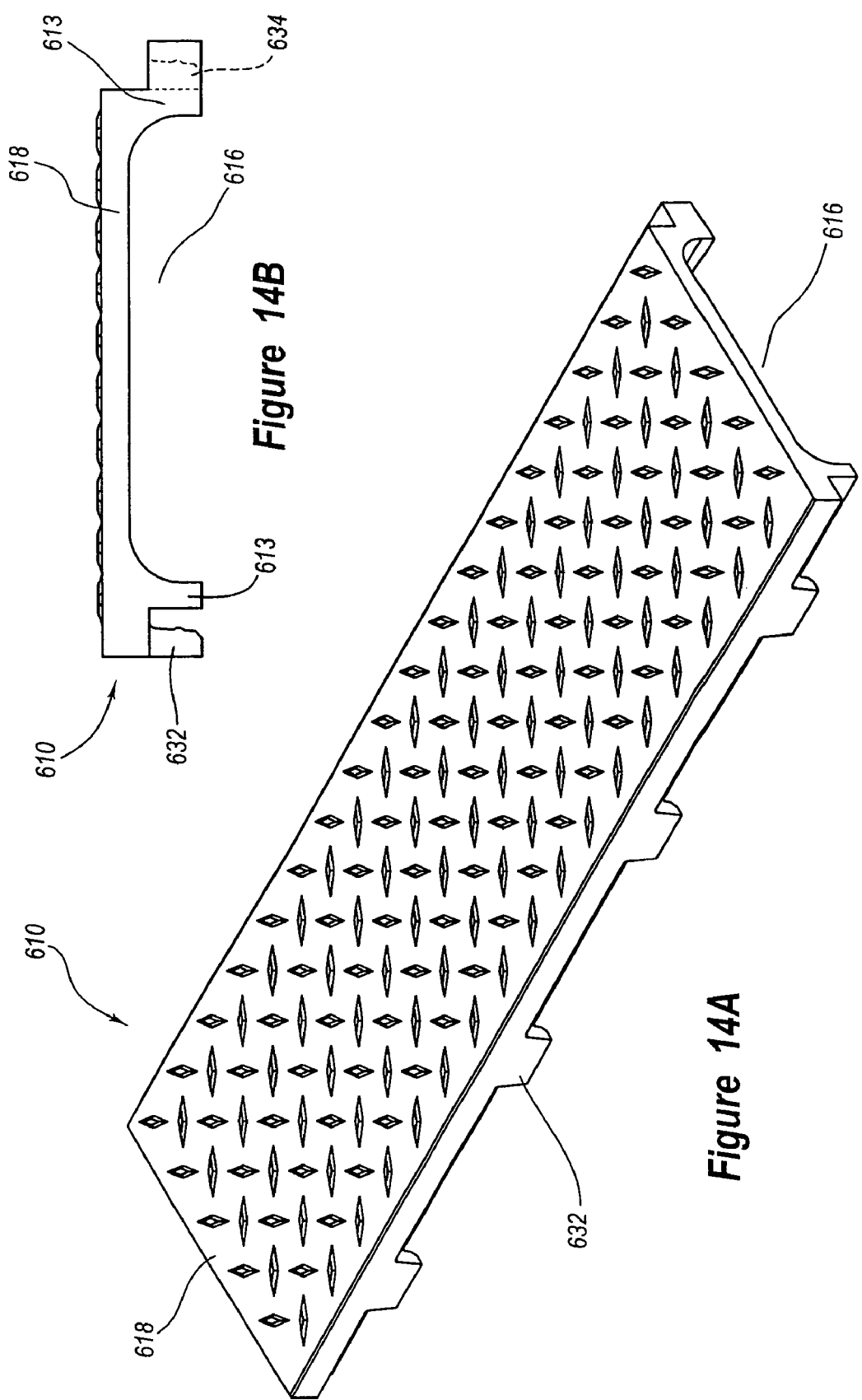
FIG. 14A is a top view of an alternative cable protector according to at least one embodiment.
FIG. 14B is an end view of the cable protector illustrated in FIG. 14A.

The elements of the exemplary cable protection systems illustrated in FIGS. 1-15, such as the cable protectors, ramps, end pieces, and edge rails illustrated in these figures, may be formed of any number or combination of suitable materials. For example, the elements of these exemplary cable protection systems may be molded of a rigid, high-strength plastic material capable of withstanding repeated loadings and stresses. Alternatively or additionally, these elements may be formed of various metallic elements, such as steel or iron. In addition, metal or plastic plating or gripping may be formed on the upper surfaces of one or more of these elements, as illustrated in FIGS. 13-15, to improve the traction of pedestrians or vehicles traveling over the cable protection system.

In addition, the various elements of the exemplary cable protection systems illustrated in FIGS. 1-15 may be of any color or opacity. For example, in at least one embodiment the various elements in these cable protection systems may be brightly or fluorescently colored to increase the conspicuousness of the system. Additionally or alternatively, the elements in these systems may be formed of a generally or substantially transparent material and illuminated by white or colored light sources to increase the visibility of the system. Generally speaking, coloring or illuminating the various elements of these cable protection system in this manner helps decrease the likelihood of injuries to pedestrians or other motorists due to their failure to notice the cable protection system extended over walkways or roadways.

Accordingly, the present invention discloses an exemplary cable protection system capable of being quickly and easily expanded to accommodate any required width or length. By using pivot and/or substantially vertically oriented connectors to removably attach ramps to a cable protector, the present invention avoids the need for conventional horizontally oriented connector elements, which results in a more efficient use of the materials used to form the base member of the cable protector, decreased cable protector production costs, and increased cable-housing capabilities. In addition, the disclosed connections are both easy to align and interconnect and are capable of withstanding relatively large amounts of torsional force.

The preceding description has been provided to enable others skilled in the art to best utilize the invention in various embodiments and aspects and with various modifications as are suited to the particular use contemplated. This exemplary description is not intended to be exhaustive or to limit the invention to any precise form disclosed. Many modifications and variations in the form and details are possible without departing from the spirit and scope of the invention. In addition, for ease of use, the words "including" and "having," as used in the specification and claims, are interchangeable with and have the same meaning as the word "comprising." It is intended that the scope of the invention be defined by the following claims.

What is claimed is:

1. A method of assembling a cable protection system, comprising:

providing at least one cable protector having at least a first side;

providing a substantially vertically oriented aperture in the first side of the cable protector;

Providing a coupling recess within the aperture;

providing a first ramp;

providing a connector on the first ramp;

providing a coupling structure on the connector of the first ramp;

inserting the connector of the first ramp into the aperture in the cable protector to removably engage the coupling structure with the female coupling recess to create a snap-fit connection and to attach the first ramp to the first side of the cable protector.

2. The method according to claim 1, wherein the aperture defined in the cable protector is slot shaped.

3. The method according to claim 1, wherein the connector of the first ramp is substantially vertically oriented.

4. The method according to claim 1, further comprising removably attaching a second ramp to a second side of the cable protector.

5. The method according to claim 4, wherein at least one of the first ramp and the second ramp is configured to laterally overlap an additional ramp or an additional cable protector.

6. The method according to claim 5, wherein at least one of the first ramp and the second ramp comprises a substantially planar top surface and an angled bottom surface.

7. A method of assembling a cable protection system, comprising:

providing at least one cable protector having at least a first side;

providing a connector on the first side of the cable protector;

providing a coupling structure on the connector of the cable protector;

providing a first ramp;

providing a substantially vertically oriented aperture in the first ramp; providing a coupling recess within the aperture;

inserting the connector of the cable protector into the aperture in the first ramp to removably engage the coupling structure with the coupling recess to create a snap-fit connection and to attach the first ramp to the first side of the cable protector.

8. The method according to claim 7, wherein the aperture defined in the first ramp is slot shaped.

9. The method according to claim 7, wherein the connector of the cable protector is substantially vertically oriented.

10. The method according to claim 7, further comprising removably attaching a second ramp to a second side of the cable protector.

11. The method according to claim 10, wherein at least one of the first ramp and the second ramp is configured to laterally overlap an additional ramp or an additional cable protector.

12. The method according to claim 11, wherein at least one of the first ramp and the second ramp comprises a substantially planar top surface and an angled bottom surface.

* * * * *